(12) United States Patent
Yang et al.

(10) Patent No.: US 7,043,657 B1
(45) Date of Patent: *May 9, 2006

(54) UNIVERSAL SYNCHRONIZATION CLOCK SIGNAL DERIVED USING SINGLE FORWARD AND REVERSE DIRECTION CLOCK SIGNALS EVEN WHEN PHASE DELAY BETWEEN BOTH SIGNALS IS GREATER THAN ONE CYCLE

(75) Inventors: Jeongsik Yang, Santa Clara, CA (US); Young Gon Kim, Santa Clara, CA (US); Chiayao S. Tung, Cupertino, CA (US); Shuen-Chin Chang, San Jose, CA (US); Yong E. Park, Los Altos, CA (US)

(73) Assignee: Integrated Memory Logic, Inc., Campbell, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 10/682,741

(22) Filed: Oct. 8, 2003

Related U.S. Application Data

(63) Continuation of application No. 09/452,274, filed on Nov. 30, 1999, now Pat. No. 6,647,506.

(51) Int. Cl.
*G06F 1/04* (2006.01)
(52) U.S. Cl. ........................ 713/503; 711/167
(58) Field of Classification Search ........... 711/167; 713/503

See application file for complete search history.

(56) References Cited

U.S. PATENT DOCUMENTS

| | | | |
|---|---|---|---|
| 5,361,277 A | 11/1994 | Grover | |
| 5,422,918 A | 6/1995 | Vartti et al. | |
| 5,432,823 A | 7/1995 | Gasbarro et al. | |
| 5,528,187 A | 6/1996 | Sato et al. | |
| 5,696,951 A | 12/1997 | Miller | |
| 5,734,685 A | 3/1998 | Bedell et al. | |
| 5,896,055 A | 4/1999 | Toyonaga et al. | |
| 5,909,473 A | 6/1999 | Aoki et al. | |
| 5,926,837 A | 7/1999 | Watanabe et al. | |
| 5,987,576 A | 11/1999 | Johnson et al. | |
| 6,111,448 A | 8/2000 | Shibayama | |
| 6,330,627 B1 | 12/2001 | Toda | |
| 6,426,984 B1 | 7/2002 | Perino et al. | |
| 6,563,358 B1 * | 5/2003 | Goulette | 327/291 |
| 6,745,271 B1 * | 6/2004 | Toda | 710/104 |
| 6,771,107 B1 * | 8/2004 | Saeki | 327/293 |

* cited by examiner

*Primary Examiner*—Thomas C. Lee
*Assistant Examiner*—Albert Wang
(74) *Attorney, Agent, or Firm*—Sidley Austin LLP

(57) ABSTRACT

A synchronous bus system includes a clock line having a forward direction clock segment and a reverse direction clock segment connected to each of a plurality of devices. The forward direction clock segment carries a forward direction clock signal, and the reverse direction clock segment carries a reverse direction clock signal. Synchronization clock circuitry, provided in each device, receives the forward direction clock signal and the reverse direction clock signal. Using the received clock signals, the synchronization clock circuitry derives a universal synchronization clock signal which is synchronous throughout all devices. Skew correction circuitry, provided in at least a portion of the devices, corrects for skew between the universal synchronization clock signal and one or more data signals for transferring data between devices.

5 Claims, 20 Drawing Sheets

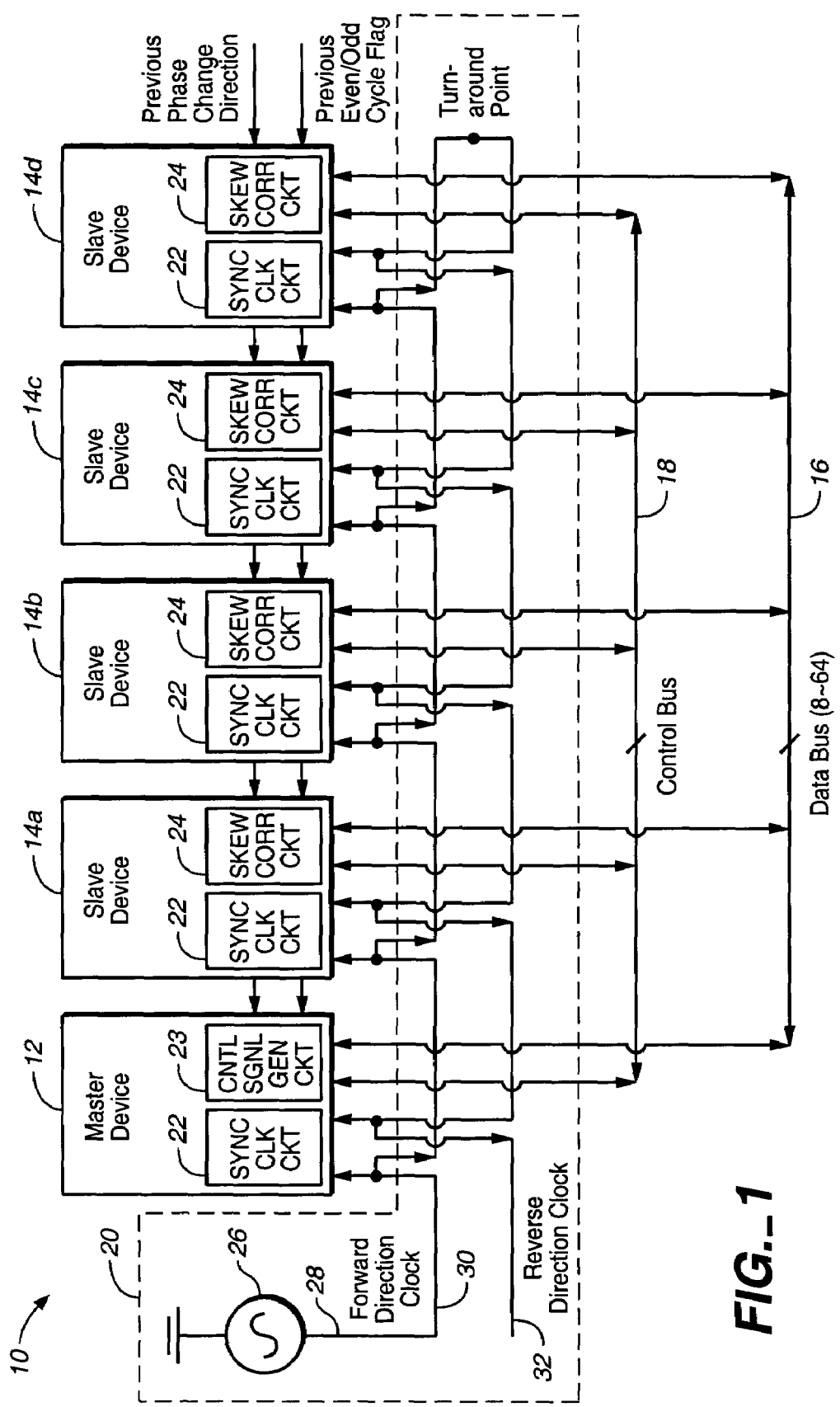
FIG._1

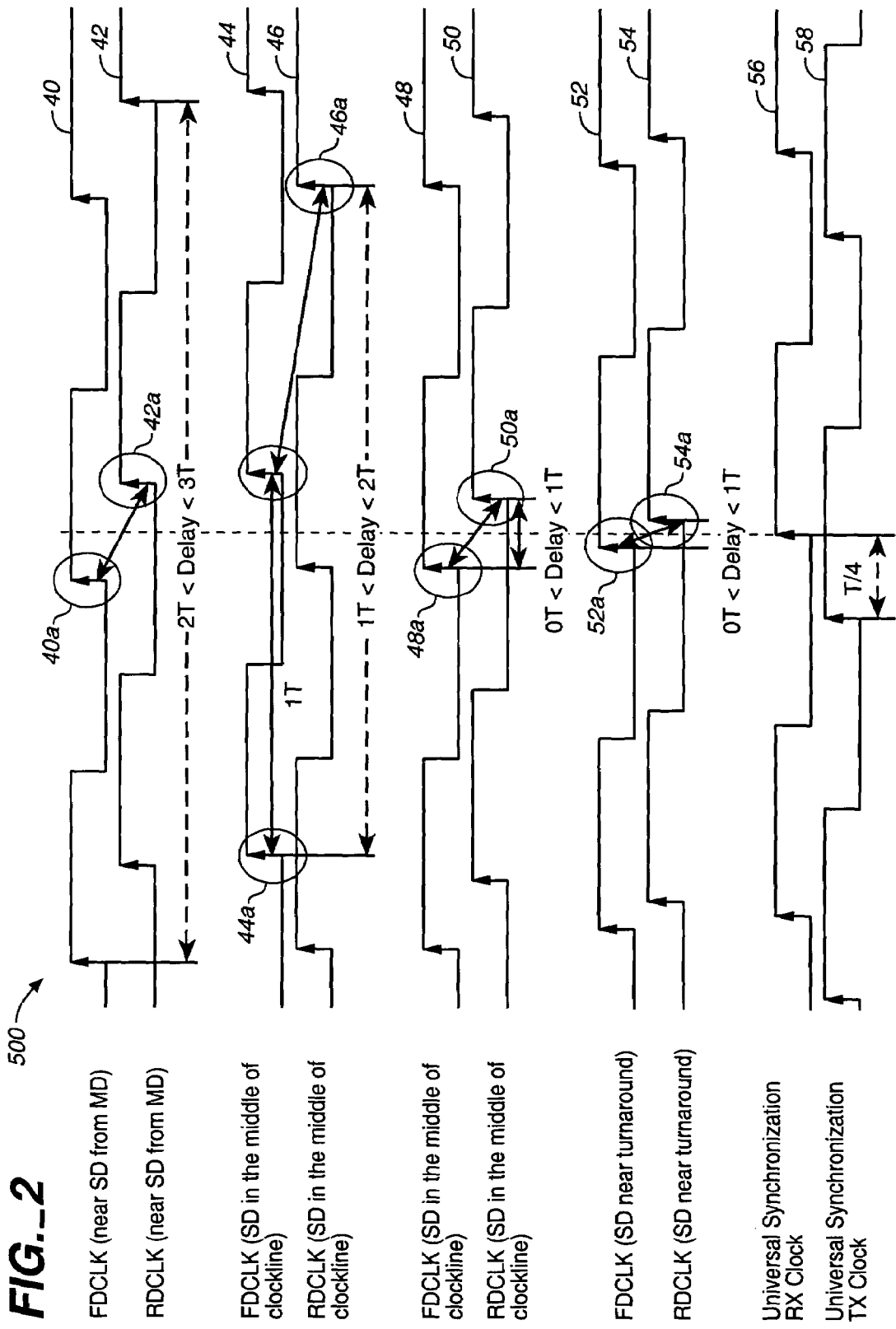

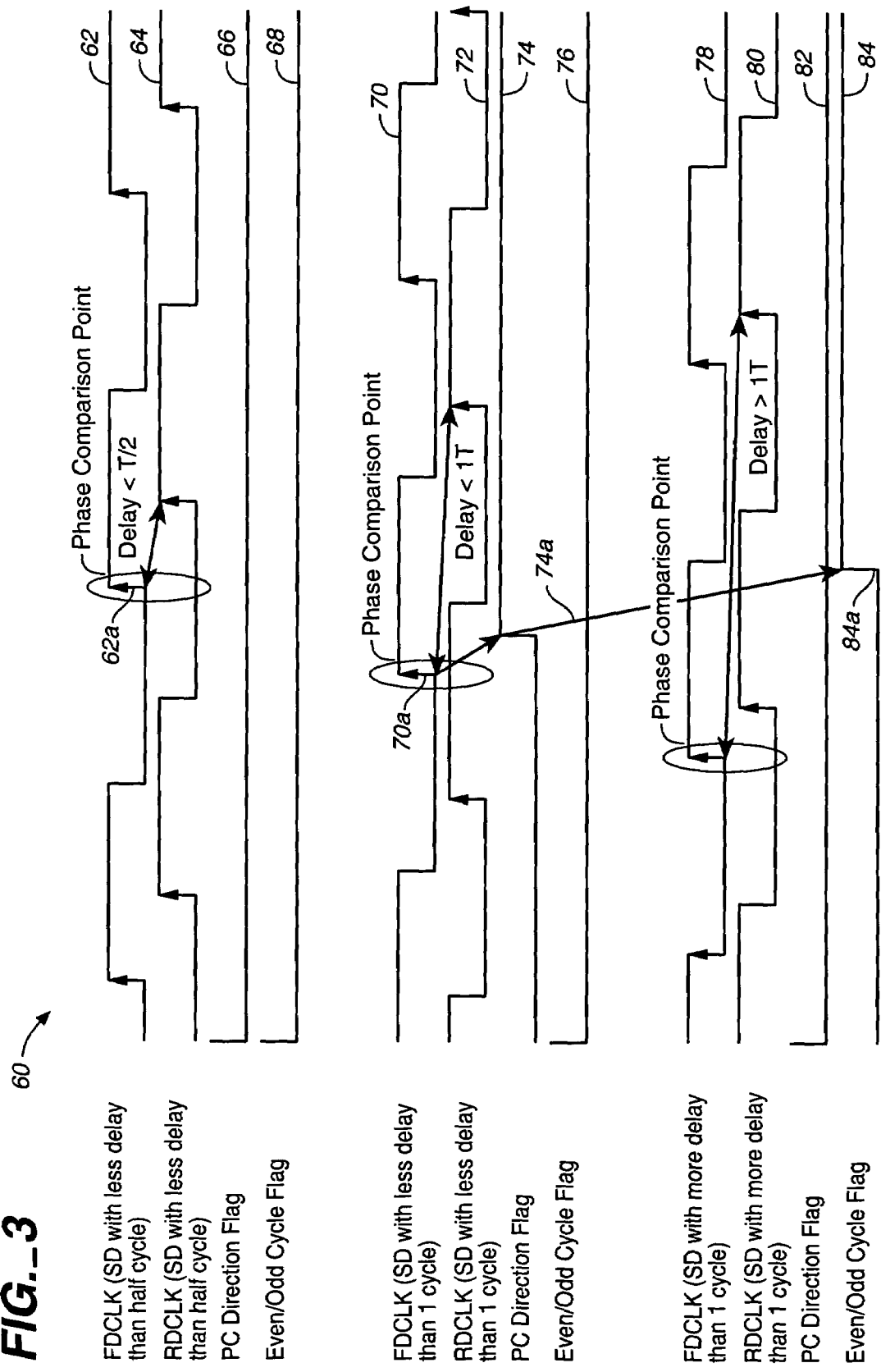

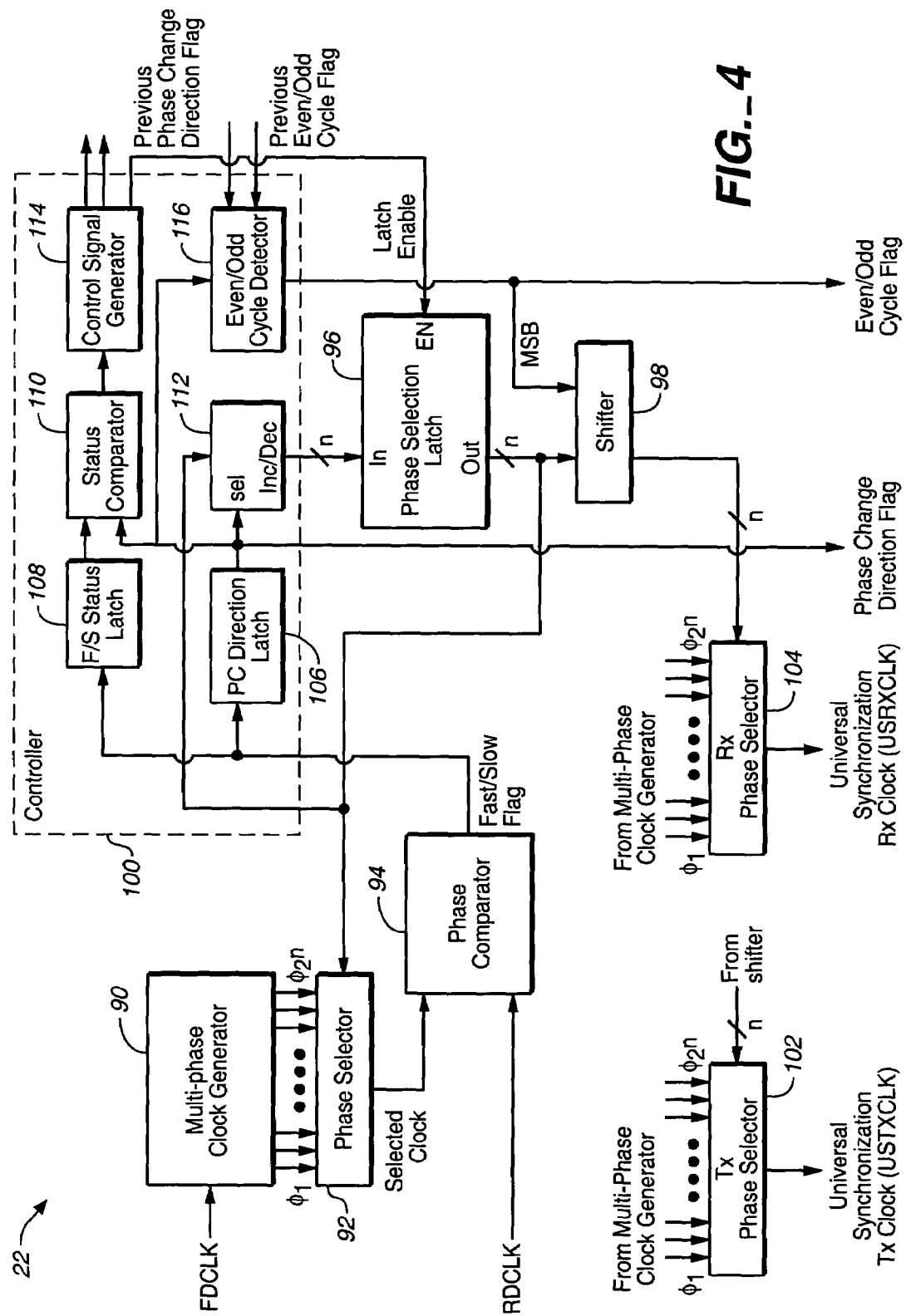
FIG._4

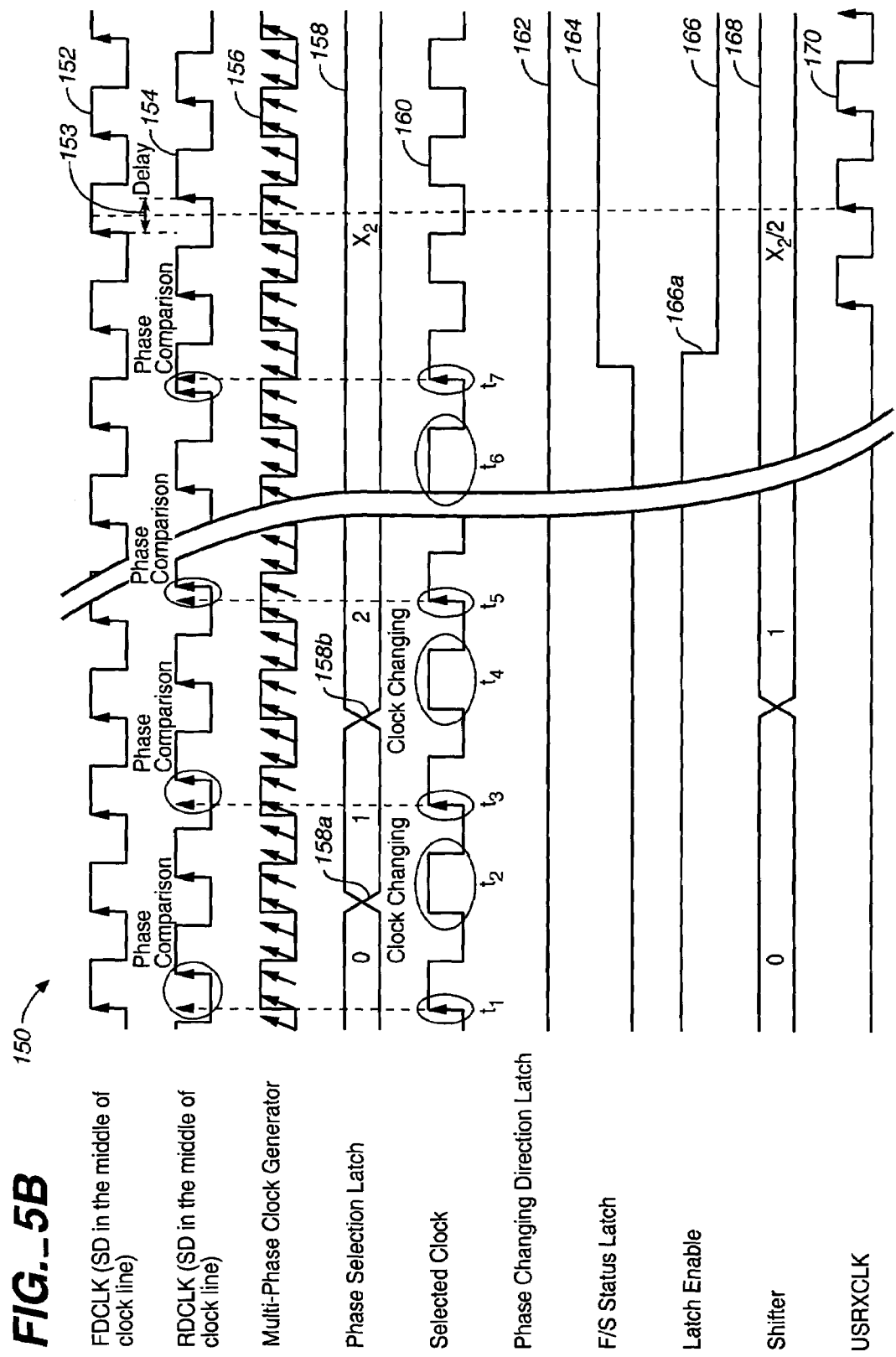

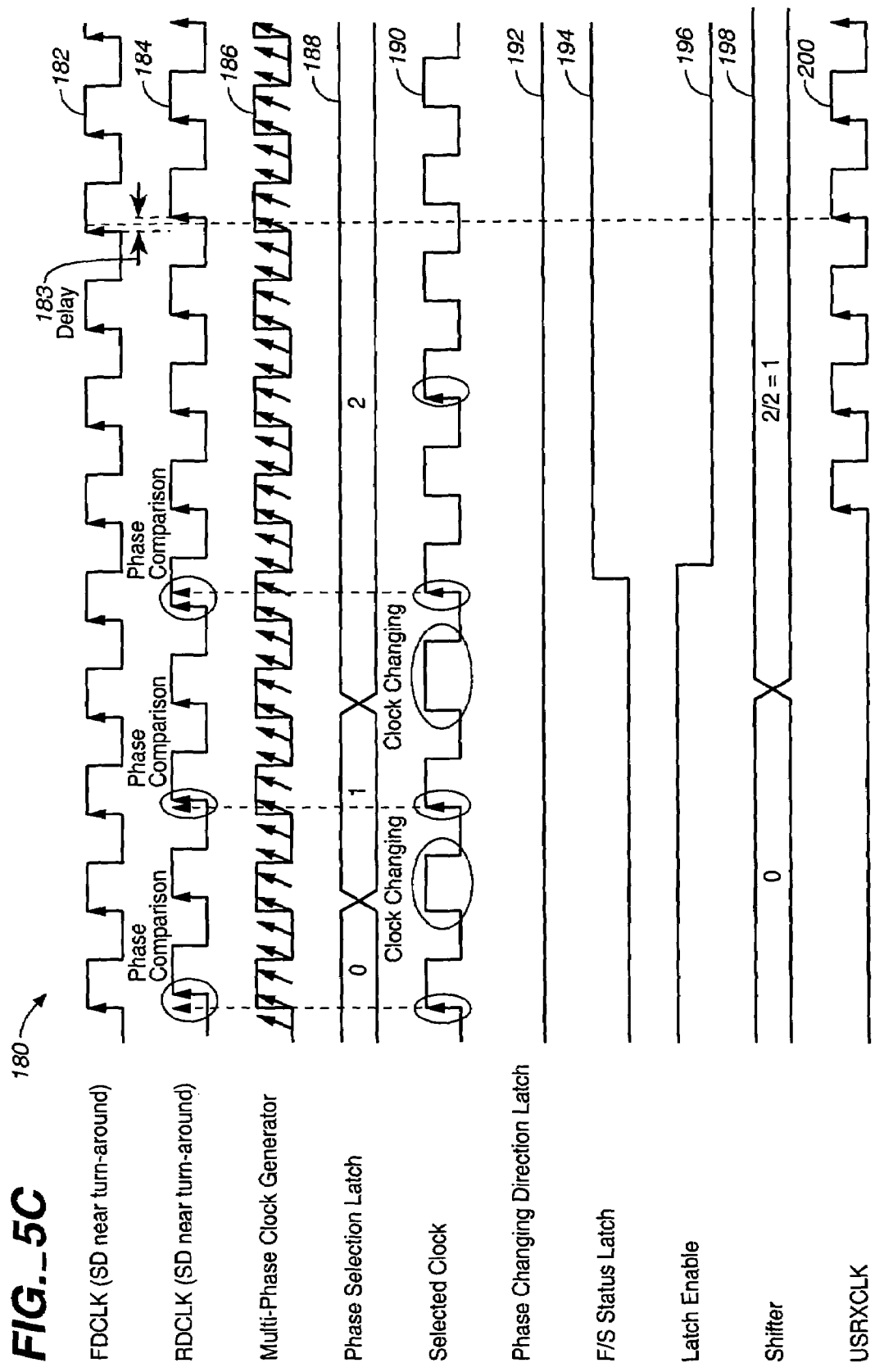

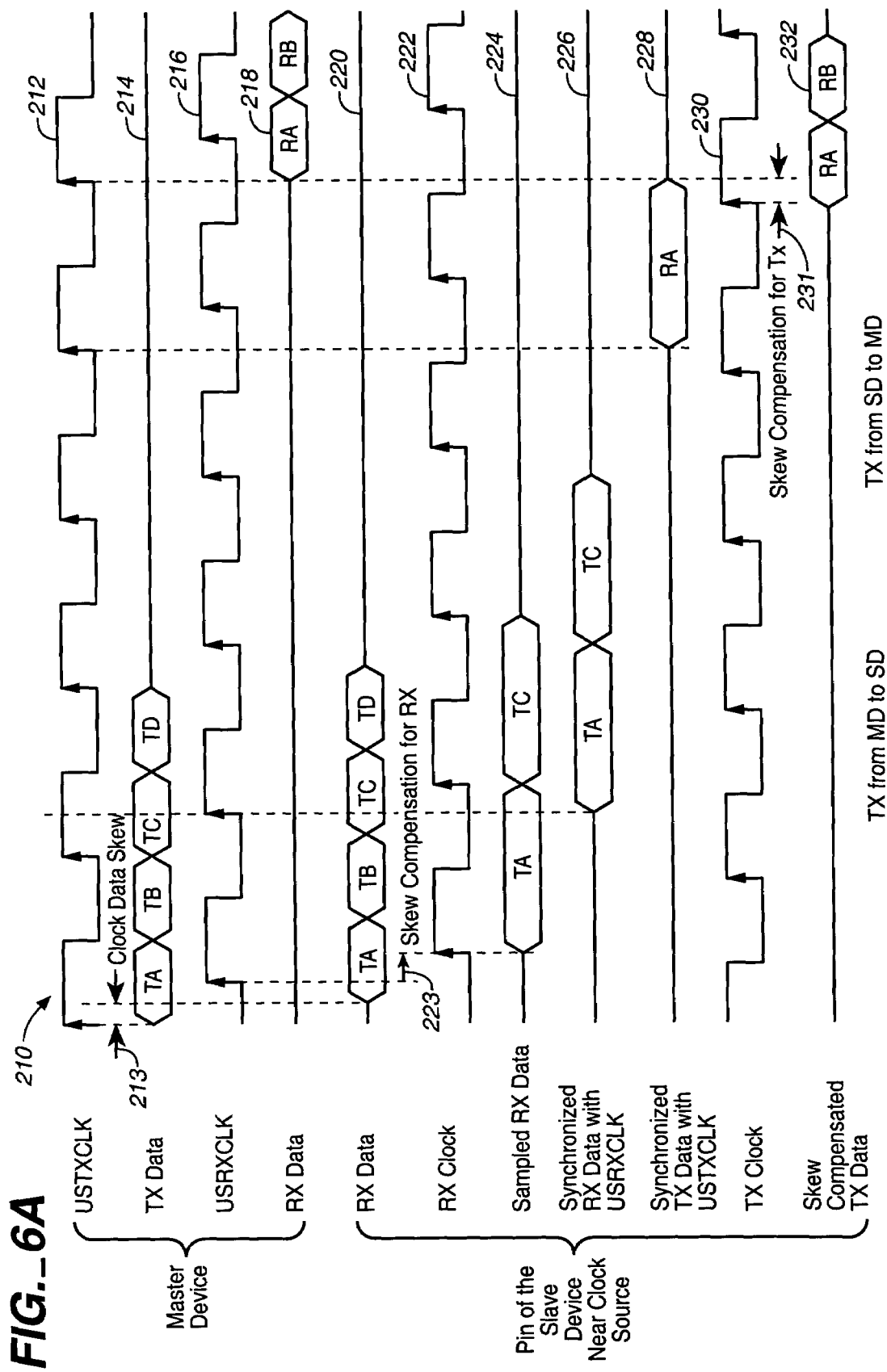
FIG._6A

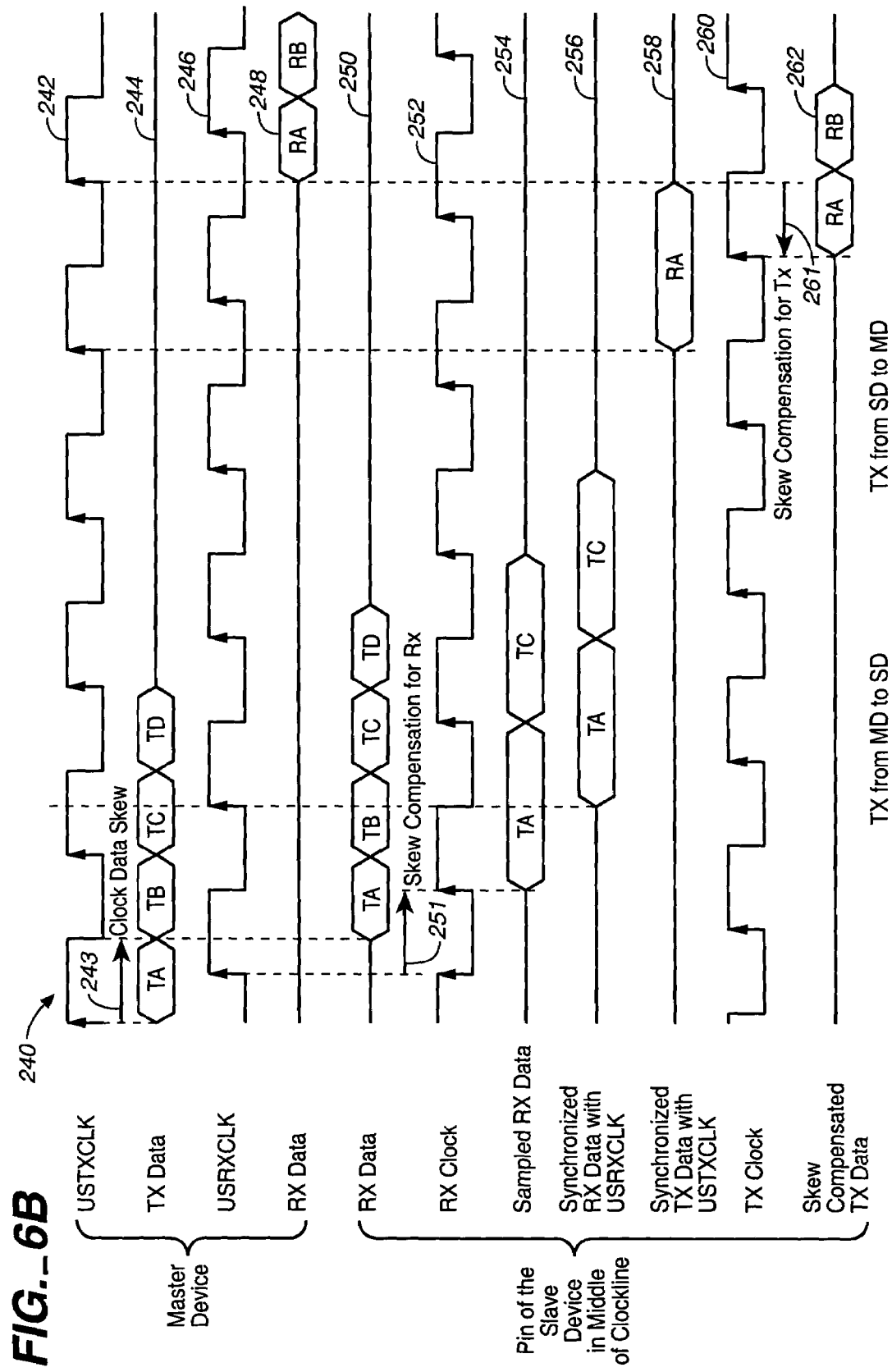

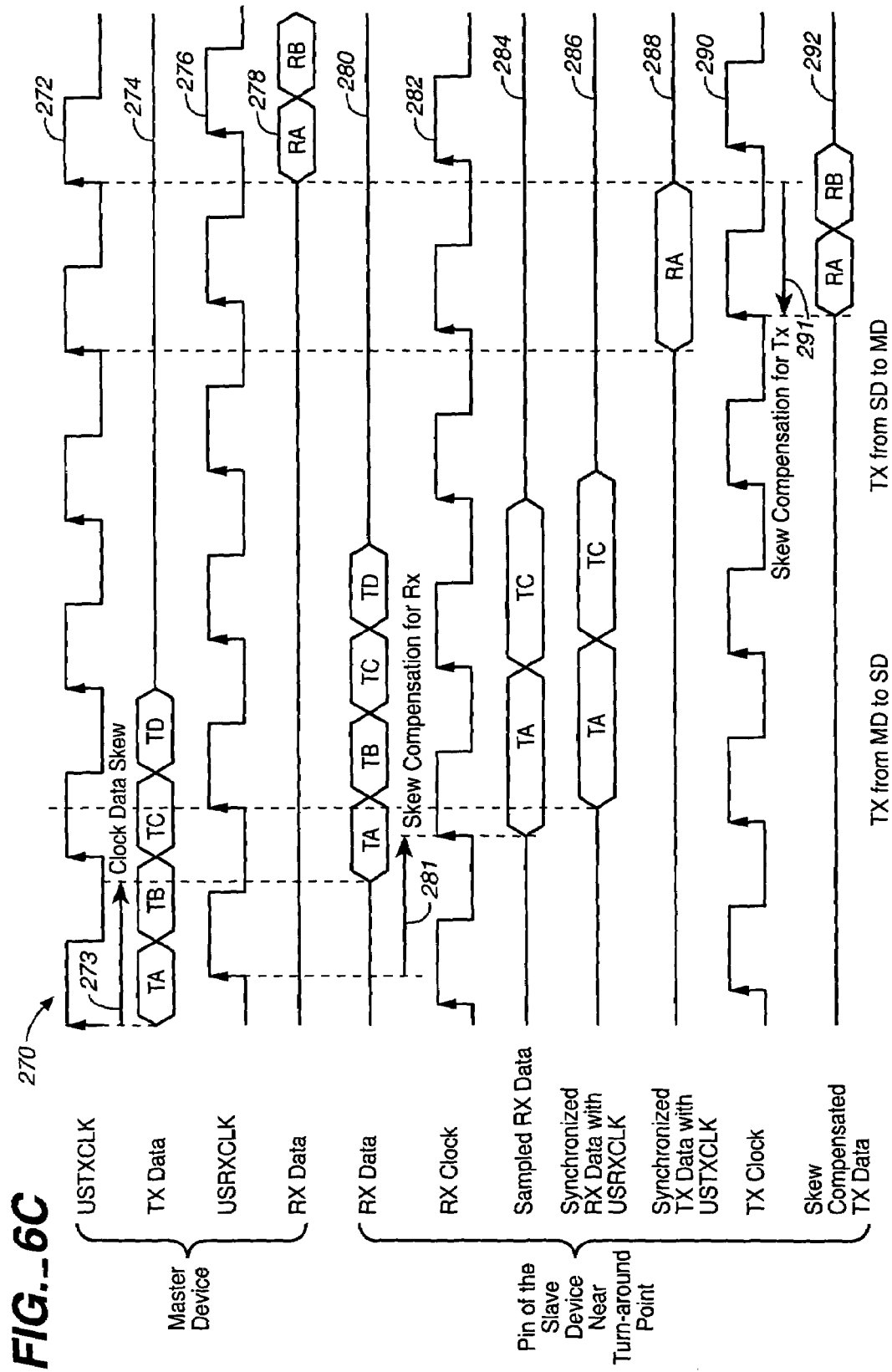

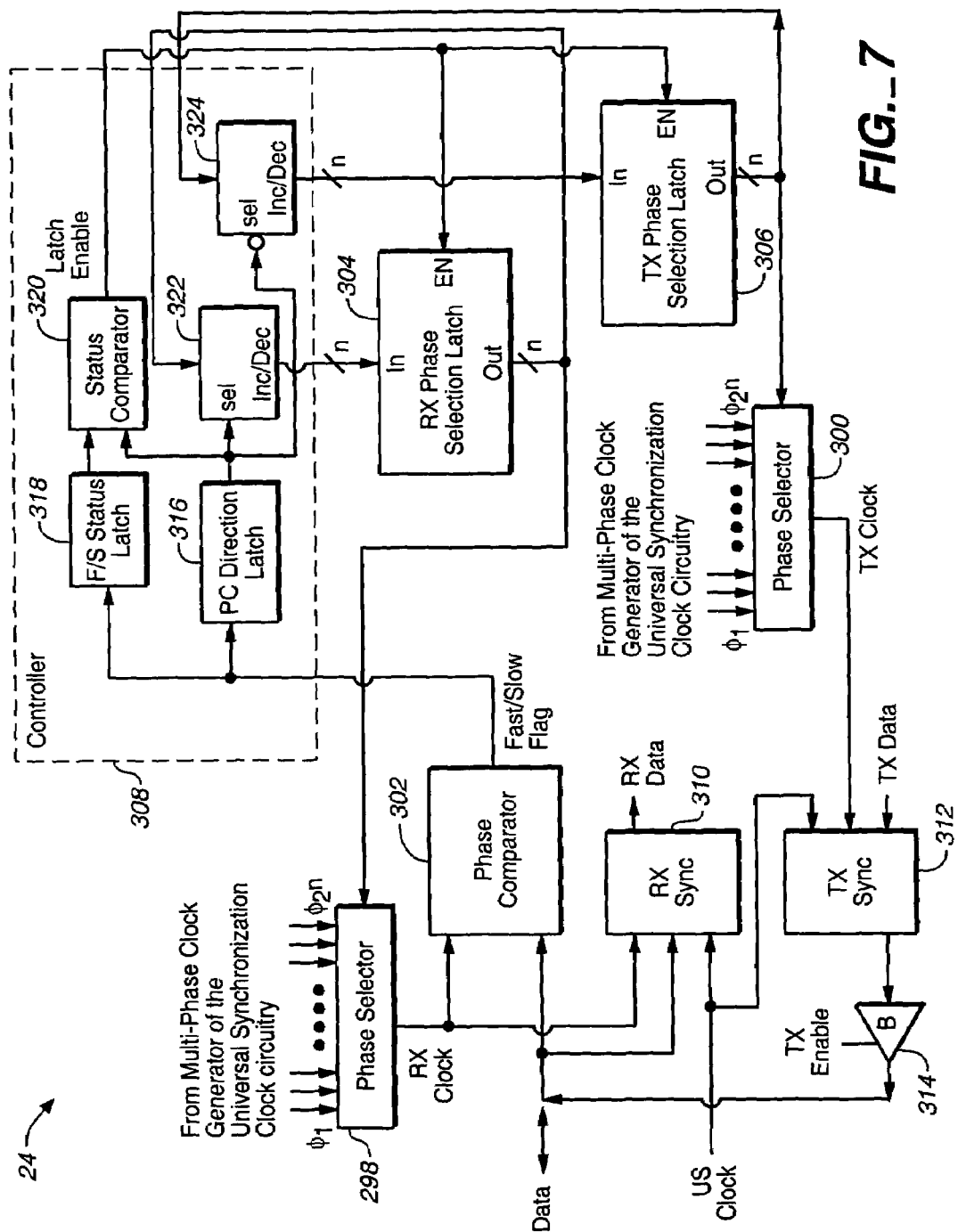
FIG._7

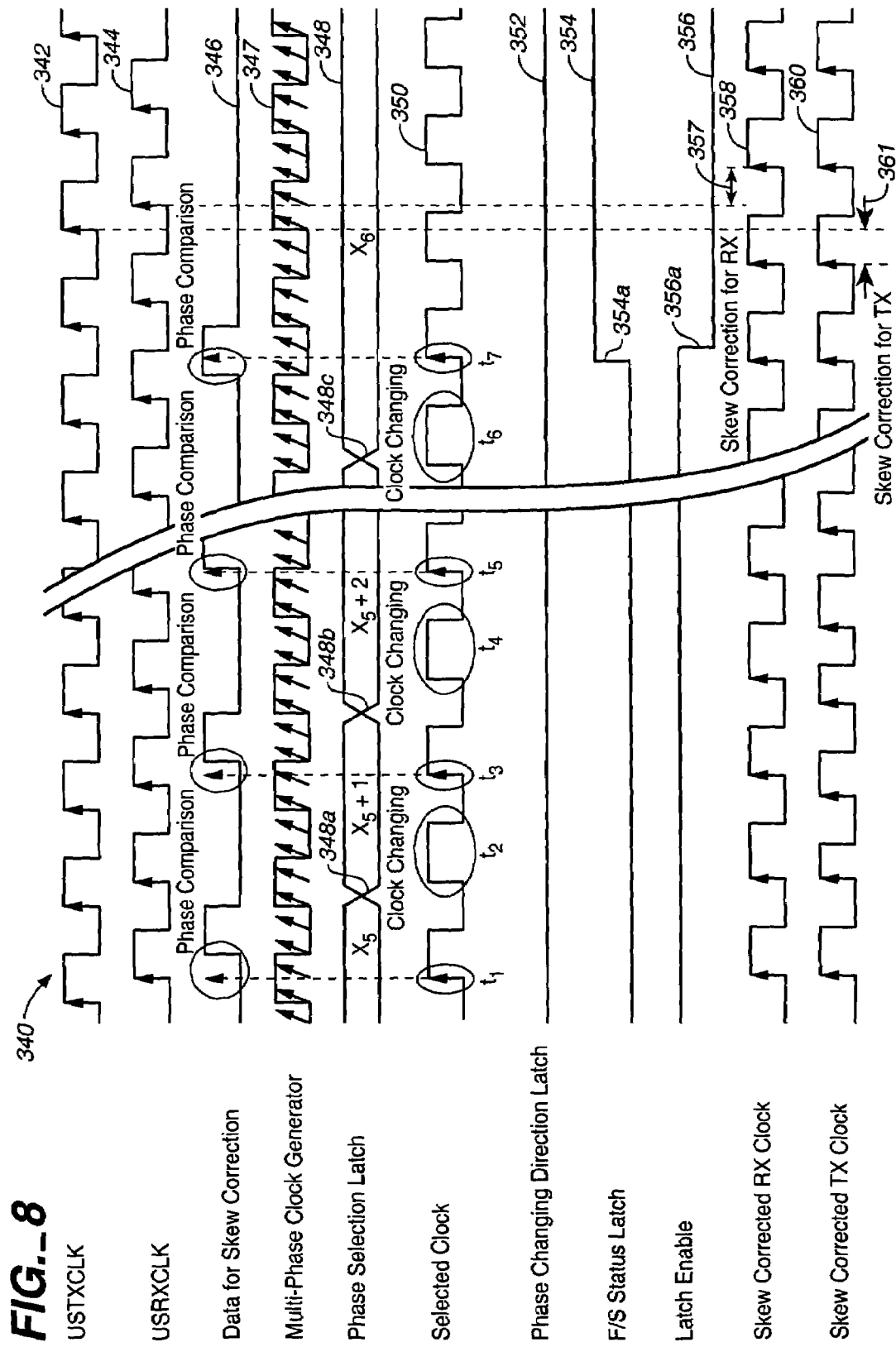
FIG._8

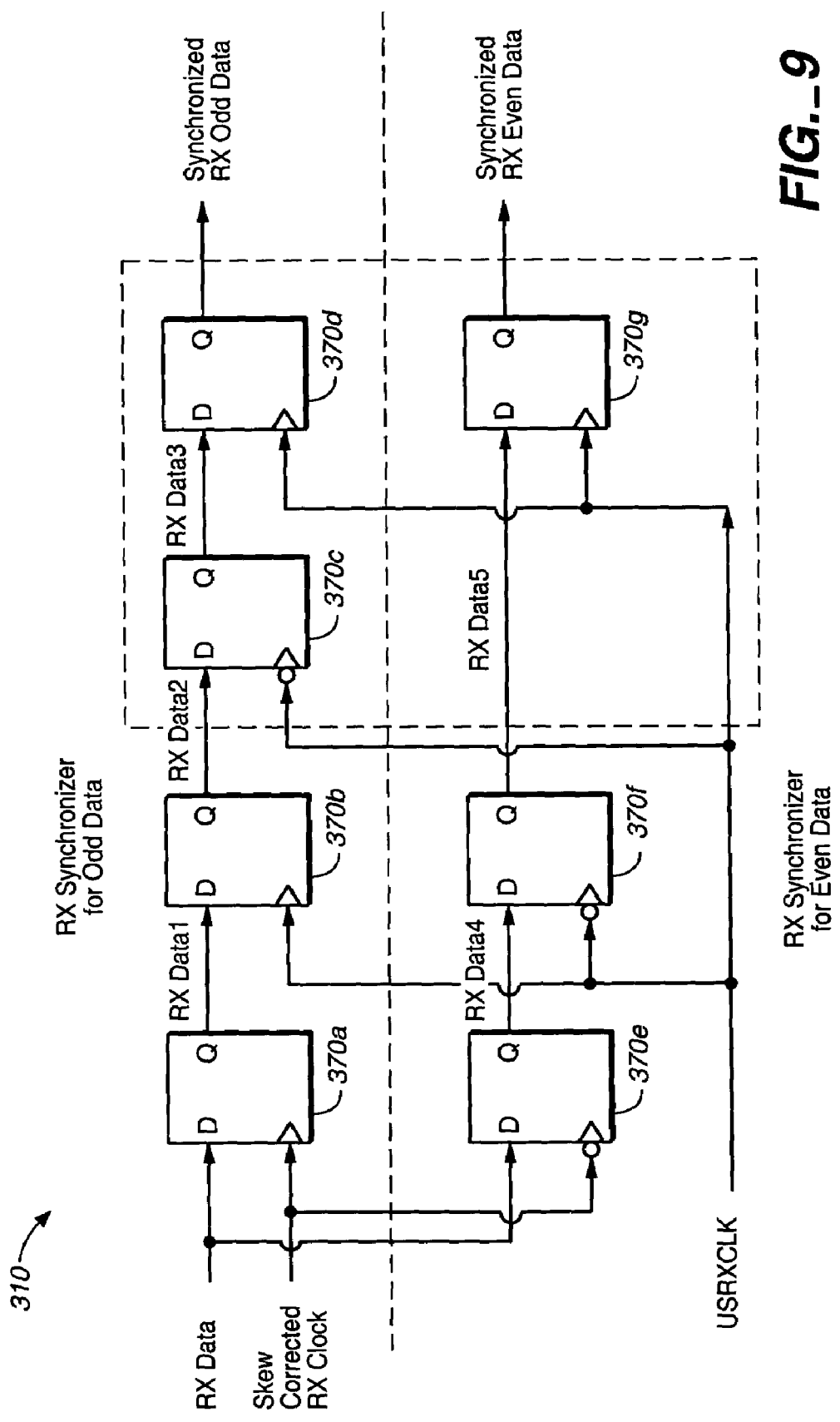
FIG._9

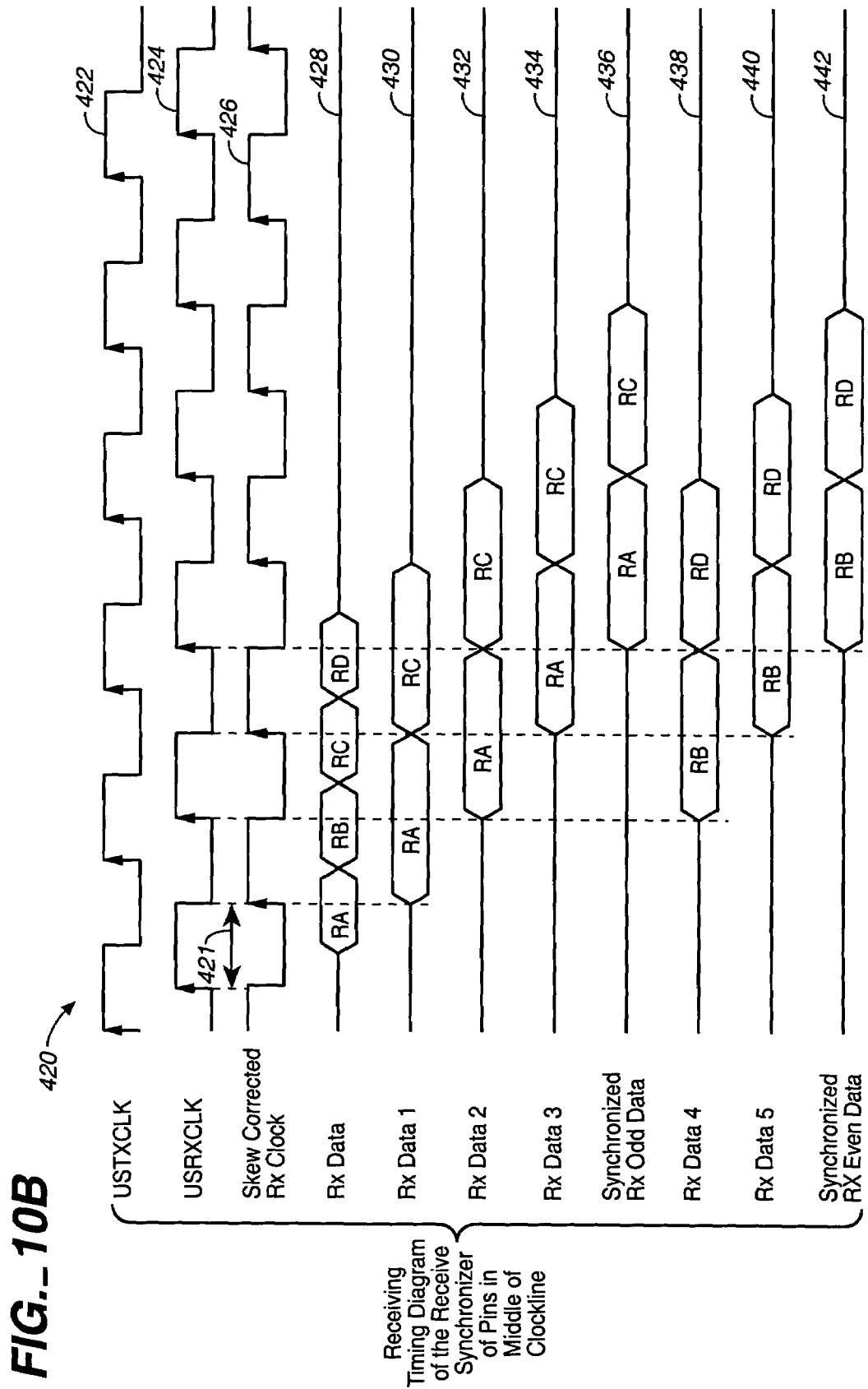

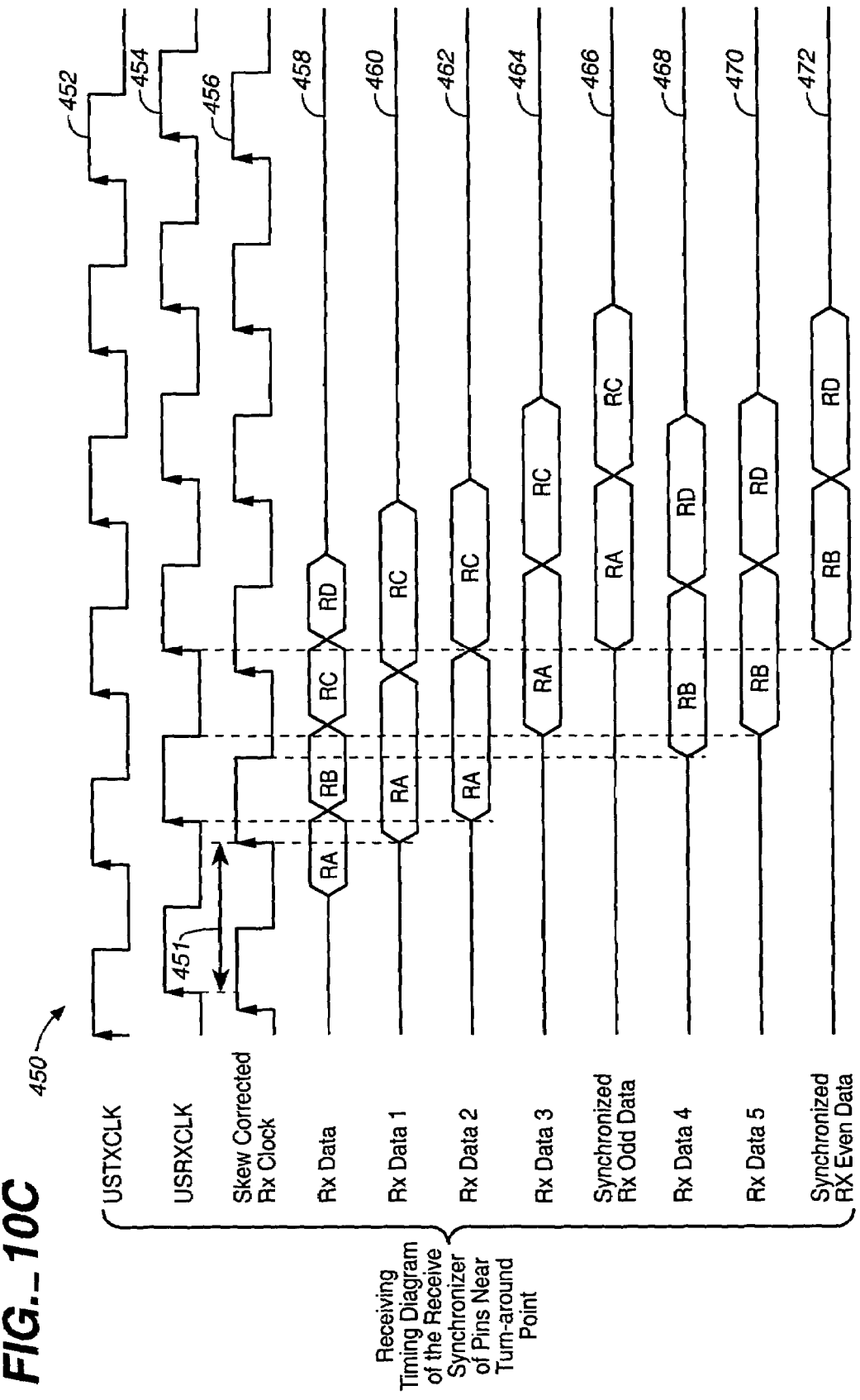
FIG._10C

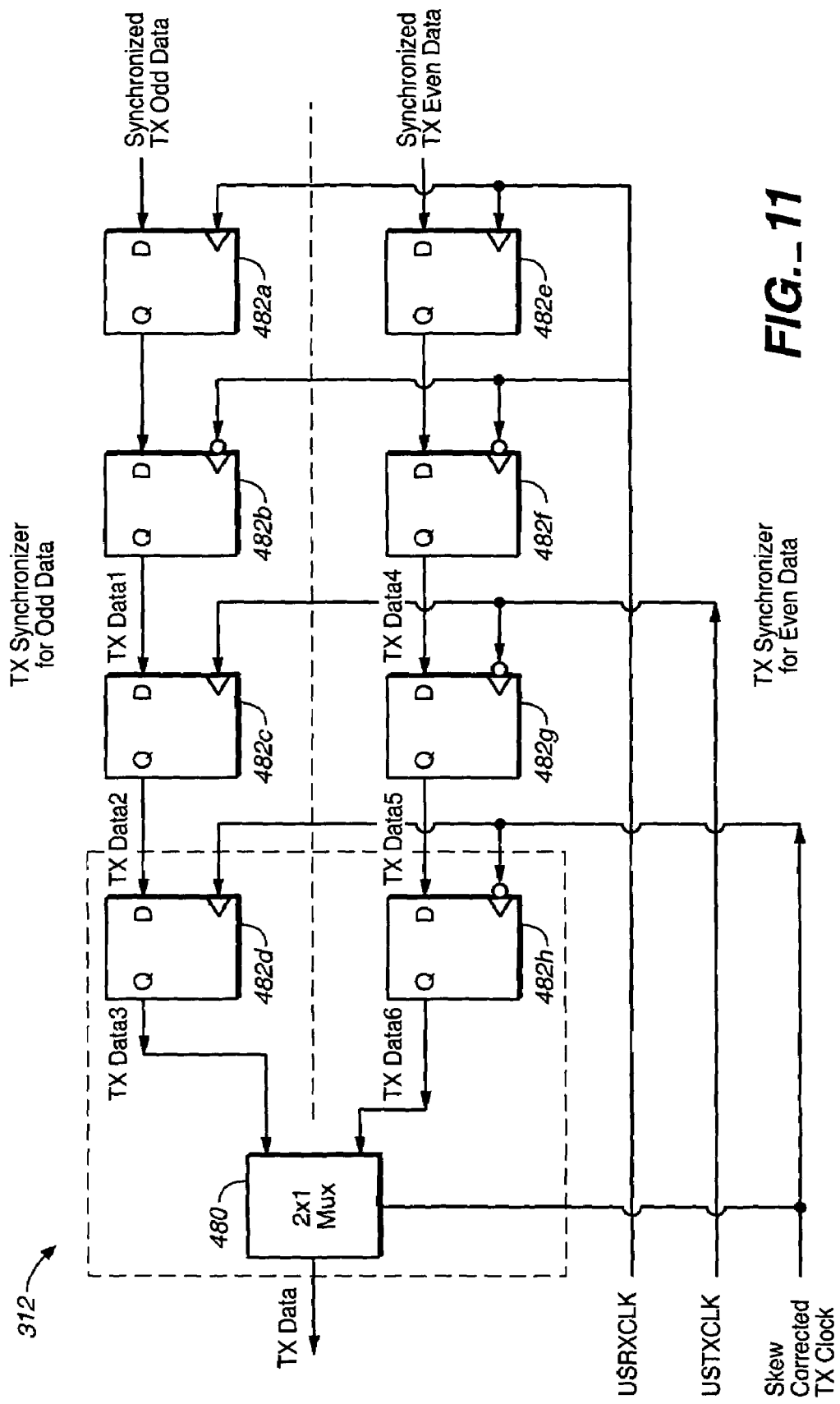
FIG._11

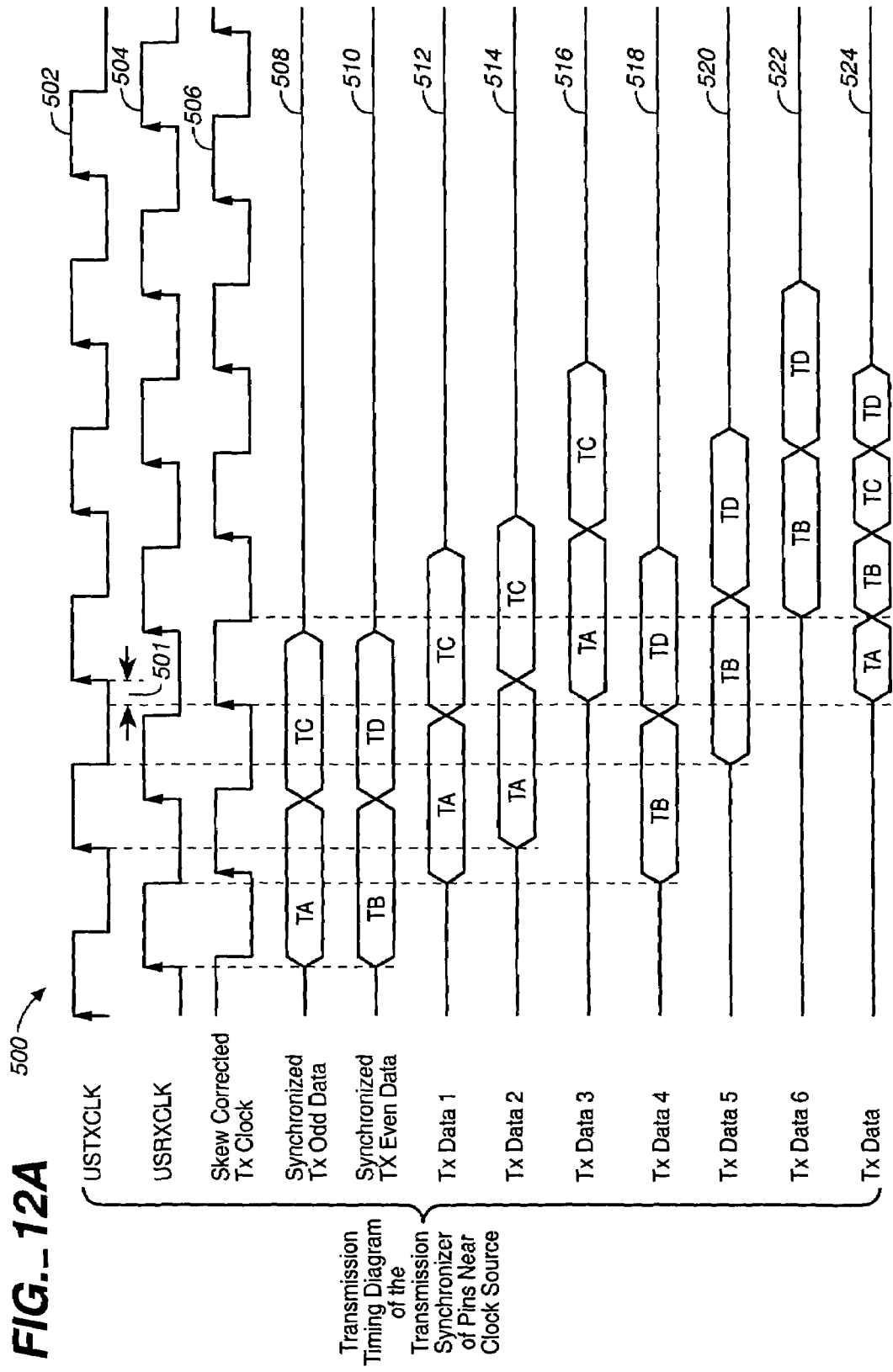

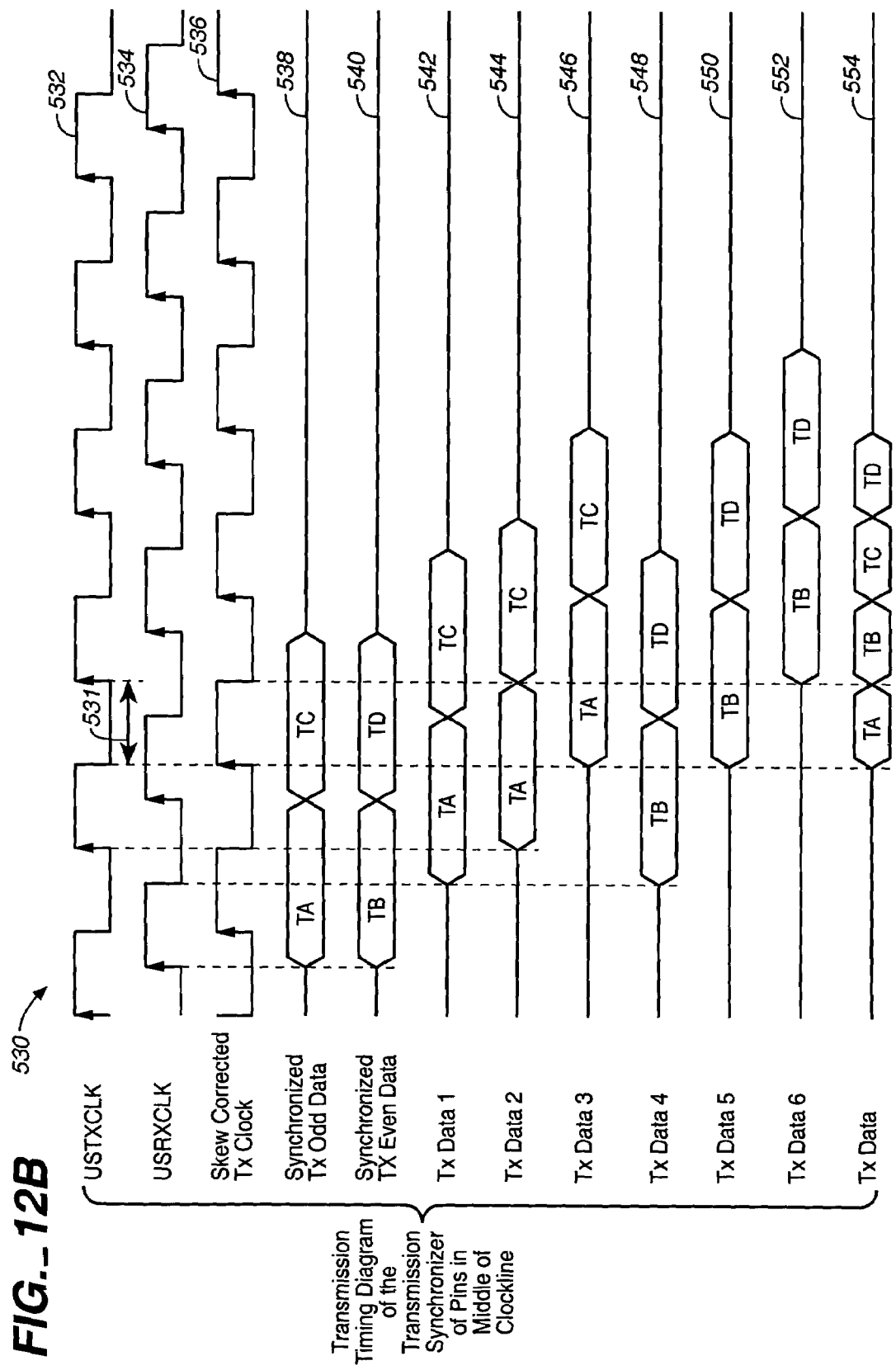
FIG._12B

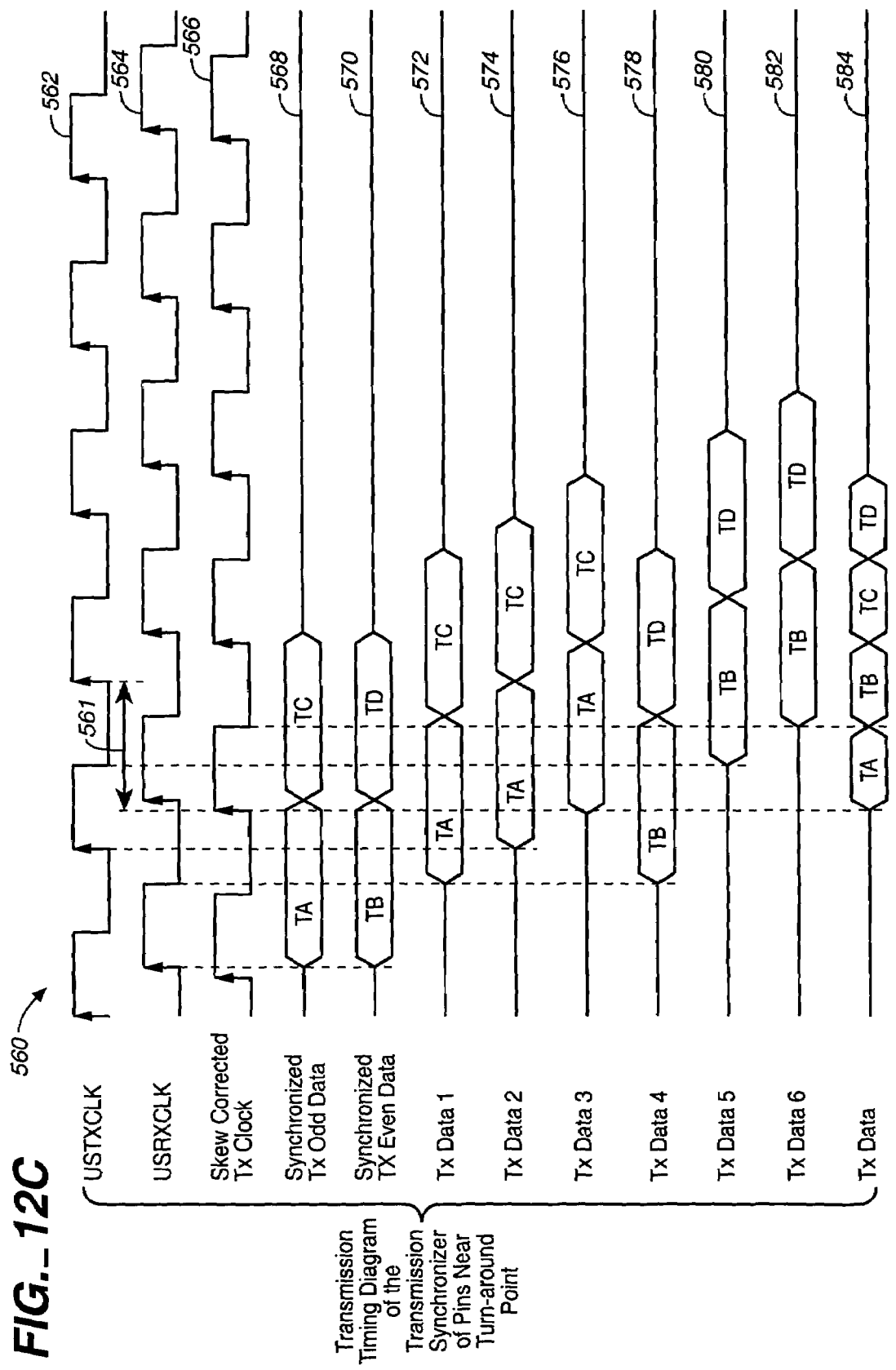
FIG._12C

UNIVERSAL SYNCHRONIZATION CLOCK SIGNAL DERIVED USING SINGLE FORWARD AND REVERSE DIRECTION CLOCK SIGNALS EVEN WHEN PHASE DELAY BETWEEN BOTH SIGNALS IS GREATER THAN ONE CYCLE

CROSS-REFERENCE TO RELATED PATENT APPLICATION

The present application is a continuation application of co-pending U.S. patent application Ser. No. 09/452,274, filed on Nov. 30, 1999, now U.S. Pat. No. 6,647,506 entitled "Universal Synchronization Clock Signal Derived Using Single Forward And Reverse Direction Clock Signals Even When Phase Delay Between Both Signals Is Greater Than One Cycle" and assigned to the present assignee, which relates to the subject matter disclosed in U.S. patent application Ser. No. 09/369,636 filed on Aug. 6, 1999, entitled "INPUT/OUTPUT INTERFACING FOR A SEMICONDUCTOR CHIP," now U.S. Pat. No. 6,477,592, both of which are incorporated in their entirety herein by reference.

TECHNICAL FIELD OF THE INVENTION

The present invention relates generally to the field of electronic devices, and more particularly, to a system and method for universal synchronization clock.

BACKGROUND OF THE INVENTION

In the field of electronics, a collection of wires or lines which connect several electronic devices is called a bus. Because a bus can effectively be shared by multiple devices, modern computer systems may incorporate one or more bus systems for the communication of data between devices. Such bus systems can be synchronous or asynchronous. A synchronous bus system utilizes a clock signal to time the transfer of data. In contrast, an asynchronous bus system does not utilize a clock signal for the transfer of data.

In general, synchronous bus systems allow data to be transferred more rapidly than asynchronous bus systems. Consequently, synchronous bus systems are widely used for high-speed devices (e.g., memory, hard disk drive, video controller, etc.), whereas asynchronous bus systems are preferred for low-speed devices (e.g., mouse, keyboard, etc.).

A significant problem with synchronous bus systems, however, is clock-data skew. Clock-data skew is a delay between a data signal and the clock signal used to time the transfer data carried by the data signal. Clock-data skew is caused mainly by a mismatch between a transmission line for the clock signal and the transmission lines of the data I/O buses. This mismatch may be attributable to differences in length, impedance, or other variables. In high-speed computer systems, the amount of clock-data skew may exceed the period of a clock cycle, in which case, the transfer of data becomes more complicated and difficult if a synchronous bus system is used.

A number of previously developed techniques have attempted to solve the problem of clock-data skew in a synchronous bus system. One previously developed technique limits the length of the clock line and the data bus so that clock-data skew cannot become very large. This is impractical, however, because modern computer systems require clock lines and data buses with relatively long lengths in order to support extensibility.

Another previously developed technique uses a plurality of clock sources within a bus system. Each clock source generates a respective clock signal which is output on its own clock line. Each clock line is connected to a separate device. In order to provide a reference clock with the same phase for all devices in the bus system, the clock lines must be matched so that the respective clock signals are synchronously received at the devices. A disadvantage of this previously developed technique for a bus system is its relative complexity. Because all clock lines must be perfectly matched, the system cannot be easily implemented in practice. Another disadvantage of the technique is that the operating frequency of the bus system depends on the propagation delay of the data bus. As the length of the data bus is extended, the system operation frequency must be slowed.

With yet another previously developed technique for a synchronous bus system, the clock line, all data buses, and all control buses must be perfectly matched. With this arrangement, all data and control signals travel on the respective buses in a constant phase relationship with respect to the clock signal. Accordingly, clock-data skew is reduced. A disadvantage of this previously developed technique is the requirement that all signals be perfectly matched. More specifically, in a printed circuit board (PCB) design, it is very difficult to match all signals due to various uncontrollable factors, such as variation in the length and width of the bus, mismatch of material characteristics, and corner effects of the bus.

SUMMARY OF THE INVENTION

The disadvantages and problems associated with previously developed techniques for a bus system to the transfer data between devices have been substantially reduced or eliminated using the present invention.

More particularly, the present invention relates to a bus system wherein skew correction circuitry and synchronization clock circuitry are provided. The skew correction circuitry minimizes the clock-data skew to avoid errors, and the synchronization clock circuitry generates a universal synchronization clock signal—comprising a universal synchronization clock transmission (USTXCLK) signal and a universal synchronization receive clock (USRXCLK) signal—for synchronizing the transmission of data in the bus system.

The synchronization clock circuitry, in one embodiment, is coupled to a clock line having two segments: a forward direction clock (FDCLK) segment and a reverse direction clock (RDCLK) segment. The FDCLK segment carries an FDCLK signal, and the RDCLK segment carries an RDCLK signal. The synchronization clock circuitry uses the FDCLK and RDCLK signals to derive the universal synchronization clock signal, which is synchronous throughout the system.

The skew correction circuitry, in one embodiment, can be provided for each data input/output (I/O) pin of a slave device. The skew correction circuitry may generate a transmission (TX) clock signal to correct for skew between the universal synchronization clock signal and an outgoing data signal, and a reception (RX) clock signal to correct for skew between the universal synchronization clock signal and an incoming data signal.

According to an embodiment of the present invention, a synchronous bus system includes a clock line having a forward direction clock segment and a reverse direction clock segment connected to each of a plurality of devices. The forward direction clock segment carries a forward direction clock signal, and the reverse direction clock segment carries a reverse direction clock signal. Synchronization clock circuitry, provided in each device, receives the forward direction clock signal and the reverse direction clock signal. Using the received clock signals, the synchronization clock circuitry derives a universal synchronization clock signal which is synchronous throughout all devices. Skew correction circuitry, provided in at least a portion of the devices, corrects for skew between the universal synchronization clock signal and one or more data signals.

According to another embodiment of the present invention, a synchronization clock circuitry includes a multi-phase clock generator circuit for generating a plurality of clock signals, each of which has a different phase. The multi-phase clock generator circuit receives a forward direction clock signal. A controller identifies a difference in phase between the forward direction clock signal and a reverse direction clock signal, and generates a control signal. A first phase selector circuit, coupled to the multi-phase clock generator circuit and the controller, selects one of the plurality of clock signals as a universal synchronization clock signal in response to the control signal.

According to yet another embodiment of the present invention, skew correction circuitry includes a reception data synchronizer circuit and a transmission data synchronizer circuit. The reception data synchronizer circuit corrects for skew between an incoming data signal and a universal synchronization clock signal. The transmission data synchronizer circuit corrects for skew between an outgoing data signal and the universal synchronization clock signal.

The present invention affords numerous technical advantages. One technical advantage includes providing a synchronous bus system in which the clock line does not have to be matched with the data bus in order to operate properly. This allows a relatively long clock line to be provided in the synchronous bus system, thus allowing greater extensibility of the system. Another technical advantage of the present invention includes deriving a universal synchronization clock signal which can be used as a reference clock by all devices in the synchronous bus system. Yet another technical advantage of the present invention includes compensating or correcting for the clock-data skew caused by any mismatch between the clock line and data I/O buses to avoid errors in the synchronous bus system. Still another advantage of the present invention includes minimizing or eliminating the skew between multiple data I/O lines in a synchronous bus system with a long data bus. Still yet another technical advantage of the present invention includes synchronizing all data I/O transactions to the universal synchronization clock signal in the high-speed, synchronous bus system. Other important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 1 is a block diagram of a synchronous bus system for distributing data, in accordance with an embodiment of the present invention;

FIG. 2 illustrates a number of exemplary waveforms for various signals in a synchronous bus system, according to an embodiment of the present invention;

FIG. 3 is an exemplary timing diagram for the phase change direction flag signal and even/odd cycle flag signal at each of a number of devices in a synchronous bus system, according to an embodiment of the present invention;

FIG. 4 is a block diagram of synchronization clock circuitry, according to an embodiment of the present invention;

FIGS. 5A, 5B, and 5C are timing diagrams for synchronization clock circuitry located in various devices of a synchronous bus system, according to an embodiment of the present invention;

FIGS. 6A, 6B, and 6C are timing diagrams for correcting the clock-data skew in various devices of a synchronous bus system, according to an embodiment of the present invention;

FIG. 7 is a block diagram of skew correction circuitry, according to an embodiment of the present invention;

FIG. 8 is an exemplary timing diagram for skew correction circuitry, according to an embodiment of the present invention;

FIG. 9 is a schematic diagram of a reception data synchronizer circuit, in accordance with an embodiment of the present invention;

FIGS. 10A, 10B, and 10C are timing diagrams for reception data synchronizer circuits located in various devices of a synchronous bus system, according to an embodiment of the present invention;

FIG. 11 is a schematic diagram of a transmission data synchronizer circuit, in accordance with an embodiment of the present invention; and FIGS. 12A, 12B, and 12C are timing diagrams for transmission data synchronizer circuits located in various devices of a synchronous bus system, according to an embodiment of the present invention.

DETAILED DESCRIPTION OF THE PREFERRED EMBODIMENTS

Figure 5A:
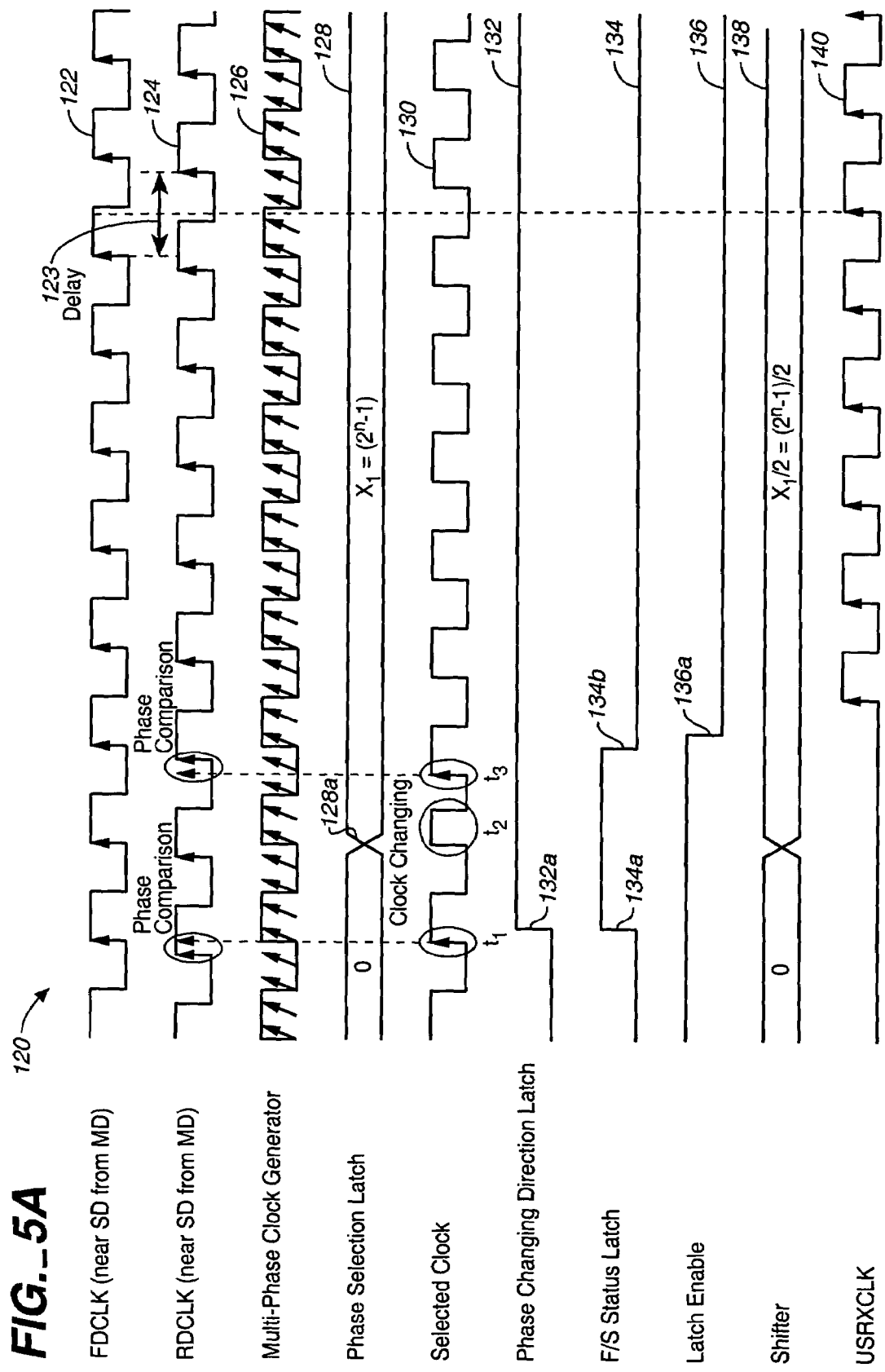

The preferred embodiments of the present invention and their advantages are best understood by referring to FIGS. 1 through 12C of the drawings. In these drawings, like numerals are used for like and corresponding parts.

Bus System

FIG. 1 is a block diagram of a synchronous bus system 10, according to an embodiment of the present invention. As depicted, bus system 10 supports the transfer of data and control information among a master device 12 and a number of slave devices 14, which are separately labeled with reference numerals 14a, 14b, 14c, and 14d.

Master device 12 and slave devices 14 are electronic devices connected in a master/slave distributed system. Master device 12 controls this distributed system. In various embodiments, master device 12 can be a microprocessor or a controller for a peripheral device. Also, in various embodiment, slave devices 14 can be high-speed memories, memory modules, peripheral controllers input/output (I/O) devices, or bus transceivers. Master device 12 can communicate with each of slave devices 14 through bus system 10, and also with other master devices (not shown). Each of slave devices 14 can only communicate with master device 12. Requests for transferring data over bus system 10 are arbitrated by master device 12.

Bus system 10 includes a data bus 16 and a control bus 18 to which master device 12 and slave devices 14 are coupled. Data bus 16 can be a bi-directional bus. Data bus 16 supports the transfer of data between master device 12 and slave devices 14. As such, data bus 16 carries one or more data signals. Similarly, control device 18 supports the transfer of control information between master device 12 and slave devices 14 and, as such, carries one or more control signals.

To coordinate the transfer of data and control information over data bus 16 and control bus 18, bus system 10 includes a clock distribution system 20 and, within master device 12 and slave devices 14, synchronization clock circuitry (SYNC CLK CKT) 22, control signal generation circuitry (CNTL SGNL GEN CKT) 23, and skew correction circuitry (SKEW CORR CKT) 24.

The clock distribution system 20 comprises a clock source 26 which is preferably located near master device 12. Clock source 26 outputs a clock signal on a clock line 28. Clock line 28 has two segments: a forward direction clock (FDCLK) segment 30 and a reverse direction clock (RDCLK) segment 32. Each of FDCLK segment 30 and RDCLK segment 32 may run physically parallel with data bus 16 and control bus 18. FDCLK segment 30 extends from one end of data bus 16 (proximate clock source 26) to a distal end of data bus 16. Clock line 28 turns around at the end of FDCLK segment 30. RDCLK segment 32 extends from the turn-around point to the first end of data bus 16.

Master device 12 and slave devices 14 are each separately coupled to both FDCLK segment 30 and RDCLK segment 32 of clock line 28. Master device 12 is preferably coupled to these segments (and also data bus 16) near clock source 26. Slave devices 14 are each coupled to the FDCLK and RDCLK segments (and data bus 16) at any other point. The clock signal travels from the end of clock line 28 near master device 12, through FDCLK segment 30, to the opposite end. The clock signal, as it is carried by FDCLK segment 30, constitutes an FDCLK signal. At the opposite end of clock line 28, the clock signal turns around and travels back toward master device 12 through RDCLK segment 32. The clock signal, as it is carried by RDCLK segment 32, constitutes an RDCLK signal.

Due to signal transmission speed, the RDCLK signal is delayed relative to the FDCLK signal. This delay gives rise to a phase difference. In one embodiment, the maximum delay between the FDCLK signal and the RDCLK signal is preferably less than one cycle of the clock signal in order for bus system 10 to operate properly. In another embodiment, the bus system 10 functions properly even when the maximum delay between the FDCLK and RDCLK signals is greater than one clock cycle. This embodiment uses a number of phase change direction flag signals and even/odd cycle flag signals.

As depicted, these phase change direction and even/odd cycle flag signals are connected serially between master device 12 and slave devices 14a–14d. That is, a first phase change direction flag signal and a first even/odd cycle flag signal are received at the slave device 14d nearest the turn-around point of the clock line 28. In one embodiment, the input values of the first phase change direction flag signal and the first even/odd cycle flag signal are zero. In response to the received phase change direction flag and even/odd cycle flag signals, slave device 14d outputs its own phase change direction flag and even/odd cycle flag signals to the next device along clock line 28 (i.e., slave device 14c). Slave device 14c, in turn, outputs its own phase change direction flag and even/odd cycle flag signals to the next immediate device (i.e., slave device 14b). This continues for each slave device 14 along clock line 28. Master device 12 receives the phase change direction flag and even/odd cycle flag signals output by slave device 14a, which is the slave device along clock line 28 furthest from the turn-around point and "last" in the series of slave devices 14. The use of phase change direction flag and even/odd cycle flag signals is described in more detail herein.

Synchronization clock circuitry 22 (in master device 12 and slave devices 14) receives the FDCLK and RDCLK signals. Synchronization clock circuitry 22 uses these signals to derive or generate a universal synchronization clock signal, which is synchronous throughout master device 12 and slave devices 14. The universal synchronization clock signal can have the same frequency as that of the FDCLK and RDCLK signals.

To derive the universal synchronization clock signal at a particular device (either master device 12 or any of slave devices 14), it is recognized that the phase difference between the FDCLK signal and the RDCLK signal varies according to the location at which the device is connected along FDCLK segment 30 and RDCLK segment 32. Regardless of where a device is located, however, the center of the phase between the FDCLK signal and the RDCLK signal is always the same. Therefore, by identifying the center of phase between the FDCLK and the RDCLK signals at each device, all devices can be provided with a universal synchronization clock signal having the same phase. The FDCLK segment 30 and the RDCLK segment 32 of clock line 28 may be matched to reduce the phase difference between the universal synchronization clock signals at each device.

The universal synchronization clock signal provides each device with reference timing information to synchronize all transfers of data (as explained in more detail below). The universal synchronization clock signal includes two components: a universal synchronization reception clock (USRXCLK) signal, and a universal synchronization transmission clock (USTXCLK) signal. Data is transmitted out of a device on the rising and/or falling edges of the USTXCLK signal. Similarly, data is received at a device on the rising and/or falling edges of the USRXCLK signal. For consistency, rising edges are used as the active edges in many of the examples and embodiments described herein; it should be understood, however, that falling edges can also be used as the active edges as well.

Control signal generation circuitry 23 is provided in master device 12. Control signal generation circuitry 23 is used to send skew correction data to all slave devices 14 after master device 14 has derived the universal synchronization clock signal. Skew correction data is used to correct for the clock-data skew in each of slave devices 14. This skew correction data may be sent out in a signal which is synchronized with USRXCLK signal. When it is time to correct for clock-data skew, master device 12 generates a transmission enable signal, and transfers the skew correction data to all slave devices 14 at the rising (or falling) edges of the USRXCLK signal while transmission is enabled.

Skew correction circuitry 24 may be provided for each data pin of slave devices 14. Skew correction circuitry 24 corrects for skew between the clock signal on clock line 28 and a data signal on data bus 16. Skew correction circuitry 24 samples for the skew correction data while the transmission enable signal is high. This sampling can be performed on the rising or falling edge of a selected, internally-generated clock signal (as described below). The selected clock signal may initially have the same phase as that of the USRXCLK signal, and changes according to the results of sampling. Once a slave device 14 has received skew correction data from master device 12, skew correction circuitry 24 estimates the clock-data skews of all data pins of the slave device, and stores information for these estimates.

Afterwards, whenever a data transfer is executed for the slave device 14, the device can correct for skew between the clock and data signals using the clock-data skew estimate information. The clock-data skew estimate information can be updated at predetermined intervals.

The topology of bus system 10 described herein ensures that the data sent by one device (e.g., master device 12 or slave device 14) onto data bus 16 can be detected by an intended destination device without error, even though some clock-data skew may exist due to mismatch between the clock line 28 and data bus 16.

In operation, initially, master device 12 and slave devices 14 each use the respective synchronization clock circuitry 22, the forward direction clock (FDCLK) signal, and the reverse direction clock (RDCLK) signal to derive the universal synchronization clock signal. The universal synchronization clock signal has two components: the universal synchronization reception clock (USRXCLK) signal, and the universal synchronization transmission clock (USTX-CLK) signal. After deriving the universal synchronization clock signal, master device 12 computes data which can be used to correct for clock-data skew in slave devices 14. Master device 12 sends this known data to all slave devices 14 with control signal generation circuitry 23.

In one embodiment, data is transmitted when the USTX-CLK signal is rising and falling. Likewise, data is received when the USRXCLK signal is rising and falling. As such, data transfers can occur at the rising and falling edges of the USTXCLK and USRXCLK signals. Thus, system 10 uses a half-clock cycle for data transmission and reception. Such a half-clock cycle is relatively small for high frequency operation and can give rise to a relatively large amount of skew between the data signal arriving at a particular slave device 14 and the USRXCLK signal which is used to receive the data signal.

Although some clock-data skew may exist, a slave device 14 is nonetheless able to detect data correctly. In particular, clock-data skew correction circuitry 24 in the slave device 14 compensates for the clock-data skew using clock-data skew information that was previously estimated. Furthermore, the slave device 14 may use phase change direction flag and even/odd cycle flag signals to derive the universal synchronization clock signal, and thus receive data correctly, in the event that the amount of clock-data skew is greater than one clock cycle.

Exemplary Signal Waveforms

FIG. 2 illustrates a number of exemplary waveforms 40, 42, 44, 46, 48, 50, 52, 54, 56, and 58 for various signals in the slave devices 14a, 14b, 14c, and 14d of synchronous bus system 10 shown in FIG. 1.

Waveforms 40 and 42 represent the forward direction clock (FDCLK) signal and the reverse direction clock (RD-CLK) signal, respectively, as received at slave device 14a located near master device 12 in the synchronous bus system 10. A comparison of waveforms 40 and 42 shows the phase difference between the FDCLK signal and the RDCLK signal at a slave device 14 that is located along clock line 28 near clock source 26. As depicted, the phase difference is between two and three clock cycles (i.e., 2T<delay<3T, where "T" is a clock cycle).

Waveforms 44 and 46 represent the FDCLK signal and the RDCLK signal, respectively, as received at slave device 14b. A comparison of waveforms 44 and 46 shows the phase difference between the FDCLK signal and the RDCLK signal at this slave device 14 located in the middle of clock line 28, but still relatively near master device 12. The phase difference is between one and two clock cycles (i.e., 1T<delay<2T).

Waveforms 48 and 50 represent the FDCLK signal and the RDCLK signal, respectively, as received at slave device 14c. A comparison of waveforms 48 and 50 shows the phase difference between the FDCLK and RDCLK signals at this slave device 14c located in the middle of clock line 28, but further from master device 12 than slave device 14b. The phase difference here is within one clock cycle (i.e., 0T<delay<1T).

Waveforms 52 and 54 represent the FDCLK signal and the RDCLK signal, respectively, as received at slave device 14d. A comparison of waveforms 52 and 54 shows the phase difference between the FDCLK and RDCLK signals at a device that is located near the turn-around point of clock line 28. The phase difference at this location is nearly 0° (i.e., 0T<delay<1T).

The phase difference between any FDCLK signal and the respective RDCLK signal can be either an "even cycle" phase difference or an "odd cycle" phase difference.

An even cycle phase difference is one in which the delay between the FDCLK signal and the RDCLK signal falls within one of the following ranges: greater than 0 clock cycles, but less than 1 clock cycle (i.e., 0T–1T); greater than 2 clock cycles, but less than 3 clock cycles (i.e., 2T–3T); greater than 4 clock cycles, but less than 5 clock cycles (i.e., 4T–5T); greater than 6 clock cycles, but less than 7 clock cycles (i.e., 6T–7T); etc. Exemplary even cycle phase differences are illustrated by waveforms 40 and 42, waveforms 48 and 50, and waveforms 52 and 54.

An odd cycle phase difference is one in which the delay between the FDCLK signal and the RDCLK signal falls within one of the following ranges: greater than 1 clock cycle, but less than 2 clock cycle (i.e., 1T–2T); greater than 3 clock cycles, but less than 4 clock cycles (i.e., 3T–4T); greater than 5 clock cycles, but less than 6 clock cycles (i.e., 5T–6T); greater than 7 clock cycles, but less than 8 clock cycles (i.e., 7T–8T); etc. An exemplary odd cycle phase difference is illustrated by waveforms 44 and 46.

Waveforms 56 and 58 represents the universal synchronization reception clock (USRXCLK) signal and the universal synchronization transmission clock (USTXCLK) signal, respectively, which are the two components of the universal synchronization clock signal. The phases of these two components of the universal synchronization clock signal are the same for all slave devices 14 in bus system 10, regardless of the devices' respective locations along clock line 28. With such a universal synchronization clock signal, data may be more rapidly transferred between the various devices. As depicted, the phase difference between the USRXCLK signal and the USTXCLK signal is one-quarter of a clock cycle (T/4).

In general, any device of synchronous bus system 10 can derive the phase of the universal synchronization clock signal using the phase difference between the FDCLK signal and the RDCLK signal appearing at the device. To find the phase difference between the FDCLK and RDCLK signals, it is first necessary to determine the respective phases for each of these signals. The phase for each of the FDCLK and RDCLK signals can be determined by identifying a positive (rising) edge of the signal or a negative (falling) edge of the signal.

In one embodiment, the derivation of phase of the universal synchronization clock signal may depend on whether the phase difference between the FDCLK and RDCLK signals is an "even cycle" phase difference or an "odd cycle" phase difference.

For a device with an even cycle phase difference, the universal synchronization clock signal has a center of phase between a given positive (or rising) edge of FDCLK signal and the first positive edge of RDCLK signal appearing at the device after the given positive edge of the FDCLK signal. For example, with reference to waveforms 40 and 42 for slave device 14*a*, the universal synchronization clock signal may be derived by splitting the difference between a given positive (or rising) edge 40*a* of the FDCLK signal and the first positive edge 42*a* of the RDCLK signal which appears at slave device 14*a* after the occurrence of the positive edge 40*a* of the FDCLK signal. With reference to waveforms 48 and 50 for slave device 14*c*, the universal synchronization clock signal may have the same phase as that of the center of phase between a given positive edge 48*a* of the FDCLK signal 48 and the first positive edge 50*a* of the RDCLK signal which appears at slave device 14*c* after the occurrence of the positive edge 48*a* of the FDCLK signal. With reference to waveforms 52 and 54 for slave device 14*d*, there is virtually no phase difference between the FDCLK signal and the RDCLK signal, as indicated by the nearly simultaneous forward edges 52*a* and 54*a* of FDCLK and RDCLK signals, respectively. Accordingly, the universal synchronization clock signal in this case can have the same phase as that of the FDCLK and RDCLK signals.

For a device with an odd cycle phase difference, the universal synchronization clock signal has a center of phase between a given positive edge of FDCLK signal and the second positive edge of RDCLK signal appearing at the device after the given positive edge of the FDCLK signal. For example, with reference to waveforms 44 and 46 for slave device 14*b*, the universal synchronization clock signal may have the same phase as that of the center of phase between a given positive edge 44*a* of the FDCLK signal and the second positive edge 46*a* of the RDCLK signal which appears at slave device 14*b* after the occurrence of the positive edge 44*a* of the FDCLK signal.

It is noted that for a device with an odd cycle phase difference, the phase difference between the FDCLK signal and the RDCLK signal can be derived or determined by adding one clock cycle to the center of phase difference between a given positive edge of the FDCLK signal and the first coming positive edge of the RDCLK signal.

In light of this, all devices of synchronous bus system 10 can derive the universal synchronization clock signal with the following information: a given positive edge of the FDCLK signal, the first coming positive edge of the RDCLK signal appearing at the device after the given positive edge of the FDCLK signal, and information about whether the phase delay between the RDCLK signal and the FDCLK signal is an even cycle phase difference or an odd cycle phase difference.

Timing Diagram for Fast/Slow and Even/Odd Cycle Flag Signals

FIG. 3 is an exemplary timing diagram 60 for the phase change direction flag signal and even/odd cycle flag signal at each of a number of devices in a synchronous bus system 10 shown in FIG. 1. The phase change direction flag signals and even/odd cycle flag signals can be used to derive the universal synchronization clock signal at the respective devices, as further described herein.

As depicted, timing diagram 60 includes exemplary waveforms 62, 64, 66, and 68 representing the FDCLK, RDCLK, phase change (PC) direction flag, and even/odd cycle flag signals, respectively, in a slave device 14 which is located near the turn-around point of clock line 28. Exemplary waveforms 70, 72, 74, and 76 represent the FDCLK, RDCLK, phase change (PC) direction flag, and even/odd cycle flag signals, respectively, in a slave device 14 which is located along the middle of clock line 28. Exemplary waveforms 78, 80, 82, and 84 represent the FDCLK, RDCLK, phase change (PC) direction flag, and even/odd cycle flag signals, respectively, in a slave device 14 (or master device 12) which is located near clock source 26.

The phase change direction flag and even/odd cycle flag signals are distinct for each device 14. These signals are connected serially between devices along clock line 28, starting from the device nearest the turn-around point of the clock line. Thus, with reference to FIG. 3, the slave device 14 nearest the turn-around point receives a first phase change direction flag signal and a first even/odd cycle flag signal (not shown), and in response, outputs its own phase change direction flag and even/odd cycle flag signals, as represented by waveforms 66 and 68. The slave device 14 nearest the first slave device 14 (and next along clock line 28) receives the phase change direction flag and even/odd cycle flag signals from the first slave device, and outputs its own phase change direction flag and even/odd cycle flag signals, as represented by waveforms 74 and 76. The slave device 14 nearest the second slave device 14 (and next along clock line 28) receives the phase change direction flag and even/odd cycle flag signals from the second slave device 14, and outputs its own phase change direction flag and even/odd cycle flag signals, as represented by waveforms 82 and 84. This continues for all devices along clock line 28 until master device 12. Master device 12 receives the phase change direction flag and even/odd cycle flag signals from the last slave device 14 along clock line 28 (i.e., the slave device 14 furthest away from the turn-around point).

The phase delay between the FDCLK signal and the RDCLK signal differs between the various devices. Referring to waveforms 62 and 64, the delay between the FDCLK signal and the RDCLK signal may be less than half of a cycle (delay<T/2) in the slave device 14 which is located near the turn-around point of clock line 28. Referring to waveforms 70 and 72, the delay between the FDCLK signal and the RDCLK signal may be less than a cycle (delay<1T) in the slave device 14 which is located along the middle of clock line 28. Referring to waveforms 78 and 80, the delay between the FDCLK signal and the RDCLK signal may be greater than a cycle (delay>1T) in the slave device 14 which is located near clock source 26.

Because there is delay between the FDCLK signals and the RDCLK signals, each FDCLK signal may either lead or lag the respective RDCLK signal. For example, the FDCLK signal represented by waveform 62 leads the RDCLK signal represented by waveform 64, and the FDCLK signal represented by waveform 78 leads the RDCLK signal represented by waveform 80. In contrast, the FDCLK signal represented by waveform 70 lags the RDCLK signal represented by waveform 72.

As previously described, all devices of synchronous bus system 10 can derive the universal synchronization clock signal using the phase difference between the respective FDCLK and RDCLK signals appearing at the device. This requires identifying or determining the respective phase for each of the FDCLK and RDCLK signals.

In each device, a number of clock signals (not shown) are available for identifying the phases of the respective FDCLK and RDCLK signals. These clock signals have the same frequency as the FDCLK and RDCLK signals, but in a given device, each such clock signal has a different phase. In each device, a clock signal having about the same phase as the FDCLK signal may be initially selected, thereby identifying the phase of the respective FDCLK signal, as represented by waveforms 62, 70, and 78 for three slave devices 14. Afterwards, other clock signals may be selected and compared against the RDCLK signal in order to identify the phase of the respective RDCLK signal.

When comparing the RDCLK signal and a selected clock signal, if the value of the RDCLK signal is high at the rising edge of the selected clock signal, the selected clock signal lags the RDCLK signal. For example, at rising edge 70$a$ of the selected clock signal represented by waveform 70, the corresponding RDCLK signal represented by waveform 72 is high, and thus this clock signal lags the respective RDCLK signal. Alternatively, if the value of the RDCLK signal is low at the rising edge of the selected clock signal, the selected clock signal leads the RDCLK signal. For example, at rising edge 62$a$ of the selected clock signal represented by waveform 62, the corresponding RDCLK signal represented by waveform 64 is low, and thus this clock signal leads the respective RDCLK signal.

For each device, the phase change direction flag signal can indicate whether the initially selected clock signal leads or lags the RDCLK signal, and thus whether the other clock signals to be selected for comparison against the RDCLK signal should be more lagging in phase or more leading in phase than the initially selected clock signal. In one embodiment, the phase change direction flag signal has a high value (logic-1) if the initially selected clock signal lags the RDCLK signal, and accordingly, a clock signal with a more leading phase should be selected for comparison against the RDCLK signal. On the other hand, the phase change direction flag signal has a low value (logic-0) if the initially selected clock signal leads the RDCLK signal, and accordingly, a clock signal with a more lagging phase should be selected for comparison against the RDCLK signal. The phase change direction signal thus determines the direction for changing the phase of the next selected clock signal for comparison against the RDCLK signal. As such, the phase change direction flag signal can be used to adjust or change the clock signal so that a signal having a desired phase is selected.

In one embodiment, as shown, the value of the phase change direction flag signal for each device can initially be set to zero. Afterwards, the value of the phase change direction flag signal may vary according to a comparison between the RDCLK signal and the initially selected clock signal (which can have the same phase as the FDCLK signal).

The even/odd cycle flag signal generally indicates whether the phase delay between the RDCLK signal and the FDCLK signal of the present device is an even cycle phase difference or an odd cycle phase difference. In one embodiment, the even/odd cycle flag signal has a high value (logic-1) if the phase delay is an odd cycle phase difference, and the even/odd cycle flag signal has a low value (logic-0) if the phase delay is an even cycle phase difference.

To determine the value of the even/odd cycle flag signal of the present device, the following values are considered: the value of the fast/slow flag signal of the present device, the value of the fast/slow flag signal of a previous device, and the value of the even/odd cycle signal of the previous device.

The even/odd cycle signal of a present device can change when the value of the phase change direction flag signal of the previous device is high, and the value of the phase change direction flag signal of the present device is low. For example, for the device having an even/odd cycle signal represented by waveform 84, a high value for the phase change direction flag signal of the previous device (as represented at rising edge 74$a$ of waveform 74) and a low value for the phase change direction flag signal of the present device (as represented by waveform 82) allows the even/odd cycle signal of the present device to be changed.

Under the conditions described immediately above (i.e., a high value for the phase change direction flag signal of the prior device and a low value for the phase change direction flag signal of the present device), if the even/odd cycle flag signal of the previous device is low (as represented by waveform 76), the even/odd cycle flag signal of the present device will go high (as represented at rising edge 84$a$ of waveform 84). Thus, because the even/odd cycle flag signal has a high value (logic-1), the phase delay between the RDCLK signal and the FDCLK signal of the present device is an odd cycle phase difference.

Alternatively, under the conditions of a high value for the phase change direction flag signal of the prior device and a low value for the phase change direction flag signal of the present device, if the even/odd cycle flag signal of the previous device is high, the even/odd cycle flag signal of the present device will remain low. Thus, because the even/odd cycle flag signal has a low value (logic-0), the phase delay between the RDCLK signal and the FDCLK signal of the present device is an even cycle phase difference.

Synchronization Clock Circuitry

FIG. 4 is a block diagram of synchronization clock circuitry 22, in accordance with an embodiment of the present invention. Separate synchronization clock circuitry 22 may be incorporated into each of master device 12 and slave devices 14. In general, synchronization clock circuitry 22 uses a number of signals—including the forward direction clock (FDCLK) signal and the reverse direction clock (RDCLK) signal—to derive the universal synchronization clock, which can be used for the synchronization of all devices in synchronous bus system 10. As depicted, synchronization clock circuitry 22 includes a multi-phase clock generator circuit 90, a phase selector circuit 92, a phase comparator circuit 94, a phase selection latch circuit 96, a shifter circuit 98, controller 100, transmission phase selector circuit 102, and reception phase selector circuit 104.

Multi-phase clock generator circuit 90 receives the FDCLK signal. From the FDCLK signal, multi-phase clock generator circuit 90 generates multi-phase clock signals $\phi_1, \ldots \phi_{2^n}$, where n is the number of bits for the phase selection latch circuit 96 (explained below). These clock signals $\phi_1, \ldots \phi_{2^n}$ have the same frequency as, but different phases from, the FDCLK signal in one clock cycle (or 360°). The phase difference between sequential clock signals $\phi_1, \ldots, \phi_{2^n}$ is determined by the number of bits of the phase selection latch circuit. In the case of n bits, the phase difference will be $360°/2^n$. This amount of $360°/2^n$ is the minimum resolution of the universal synchronization clock signal. For example, if n=5, multi-phase clock generator has $32 (=2^5)$ clock signals, and the minimum resolution is 11.25° $(=360°/32)$. The number of clock signals coincides with the number of phases available for a universal synchronization clock signal. Thus, not every phase value will be available for the universal synchronization clock signal. Instead, the phase of the universal synchronization clock signal must be one of the phases of clock signals $\phi_1, \ldots, \phi_{2^n}$.

Each clock signal ($\phi_1$, ..., or $\phi_{2^n}$) output by multi-phase clock generator circuit 90 can have a separate numerical designation. For example, the clock signal with the same phase as the FDCLK signal may have the numerical designation "0." The clock signal which lags the FDCLK signal by one unit in phase may have the numerical designation "1." The clock signal which leads the FDCLK signal by one unit in phase may have the numerical designation "$\phi_1$, ..., $\phi_{2^n}-1$."

Phase selection latch circuit 96 latches or stores a value which is a numerical designation (0, ..., $2^n-1$) for one of the clock signals $\phi_1$, ..., $\phi_{2^n}$ output by multi-phase clock generator circuit 90. In one embodiment, the value initially stored in phase selection latch circuit 96 is zero, which designates the clock signal having the same phase as the FDCLK signal. The value stored in phase selection latch circuit 96 may be represented in binary form by n bits of data, which is also the storage capacity of the latch circuit. This number of bits (i.e., n) can be adjusted (i.e., made higher or lower) according to the number of clock signals which would desirably be output by multi-phase clock generator circuit 90. That is, if a greater number of clock signals is desired, n may be increased; if a smaller number of clock signals is desired, n may be decreased.

Phase selection latch circuit 96 receives an increment/decrement (INC/DEC) signal and a latch enable signal. The INC/DEC signal can be an n-bit signal which increments or decrements the numerical value stored in phase selection latch circuit 96. The latch enable signal allows the numerical value to be changed. In one embodiment, for example, when the latch enable signal is "high" (i.e., logic-1), the value stored in phase selection latch circuit 96 may be incremented or decremented; otherwise, when the latch enable signal is "low" (i.e., logic-0), the value stored in phase selection latch circuit 96 cannot be incremented or decremented. Phase selection latch circuit 96 generates a phase selection signal, which conveys the numerical designation currently stored in the latch circuit.

Phase selector circuit 92 is coupled to multi-phase clock generator circuit 90 and phase selection latch circuit 96. Phase selector circuit 92 receives the phase selection signal from phase selection latch circuit 96 and, in response, selects one of clock signals $\phi_1$, ..., $\phi_{2^n}$ output by multi-phase clock generator circuit 90. Phase selector circuit 92 thus functions as a multiplexer for the clock signals $\phi_1$, ..., $\phi_{2^n}$.

Phase comparator circuit 94 is coupled to phase selector circuit 92. Phase comparator circuit 94 receives the clock signal selected by phase selector circuit 92, and also, the RDCLK signal. Phase comparator circuit 94 compares the selected clock signal against the RDCLK signal in order to determine whether the selected clock signal leads or lags the RDCLK signal in phase. In response to this comparison, phase comparator circuit 94 outputs the fast/slow flag signal. The fast/slow flag signal indicates whether the currently selected clock signal leads or lags the RDCLK signal. If the RDCLK signal is low at a rising edge of the selected clock signal, then the selected clock signal leads the RDCLK signal and, in one embodiment, phase comparator circuit 94 outputs a low value for the fast/slow flag signal. Otherwise, if the RDCLK signal is high at a rising edge of the selected clock signal, then the selected clock signal lags the RDCLK signal and, in one embodiment, phase comparator circuit 94 outputs a high value for the fast/slow flag signal.

Controller 100 is coupled to phase comparator circuit 94 and phase selection latch circuit 96. Controller 100 is generally responsible for the control of synchronization clock circuitry 22. As depicted, controller 100 includes phase changing (PC) direction latch circuit 106, fast/slow (F/S) status latch circuit 108, status comparator circuit 110, increment/decrement (INC/DEC) circuit 112, control signal generator circuit 114, and even/odd cycle detector circuit 116.

F/S status latch circuit 108 receives the fast/slow flag signal. The value of the fast/slow flag signal depends on the result of the phase comparison between the currently selected clock signal and the RDCLK signal (performed by phase comparator circuit 94). In one embodiment, a low value (logic-0) for the fast/slow flag signal indicates that the currently selected clock signal leads the RDCLK signal, and a high value (logic-1) for the fast/slow flag signal indicates that the currently selected clock signal lags the RDCLK signal. The value of the fast/slow flag signal, and thus the value stored in F/S status latch circuit 108, can change with each separate comparison performed by phase comparator circuit 94.

Phase change (PC) direction latch circuit 106 is coupled to phase comparator circuit 94. Phase change direction latch circuit 106 stores a value for the phase change direction flag signal of the present device. The phase change direction flag signal is generated from the phase comparison between the RDCLK signal and the initially selected clock signal, which may be the clock signal having the same phase as that of the FDCLK signal. In one embodiment, if the initially selected clock signal lags the RDCLK signal in phase, then the value of the phase change direction signal will be high (logic-1). Otherwise, if the initially selected clock signal leads the RDCLK signal in phase, then the value of the phase change direction signal will be low (logic-0).

The phase change direction flag signal determines the direction for changing the phase of the next selected clock signal ($\phi_1$, ..., or $\phi_{2^n}$) to find the phase of the RDCLK signal. That is, the value stored in phase change direction flag latch circuit 106 indicates whether any additional clock signals to be selected for comparison against the RDCLK signal should be more lagging in phase or more leading in phase than the initially selected clock signal. For example, if the value of phase change direction latch circuit 106 is low, a clock signal with one minimum resolution lagging the currently selected clock signal is selected for phase comparison with the RDCLK signal. Otherwise, if the value of phase change direction latch circuit 106 is high, a clock signal with one minimum resolution leading the currently selected clock signal is selected. After the comparison of the initially selected clock signal and the RDCLK signal, the value stored in phase change direction latch circuit 106 does not change with successive comparisons between each newly selected clock signal and the RDCLK signal.

Status comparator circuit 110 is coupled to PC direction latch circuit 106 and F/S status latch circuit 108. Status comparator circuit 110 determines whether the value stored in the F/S status latch circuit 108 differs from the value stored in PC direction latch circuit 106. If these two values are different, then the rising (or falling) edge of the RDCLK signal is within one minimum phase resolution from the phase of the currently selected clock signal. Otherwise, if the value stored in the F/S status latch circuit 108 is the same as the value stored in PC direction latch circuit 106, then the rising (or falling) edge of the RDCLK signal is greater than one minimum phase resolution from the phase of the currently selected clock signal. An understanding of the relationship between the fast/slow flag signal and the phase change direction flag signal reveals why the statements set forth immediately above are true.

Initially, the value of fast/slow flag signal is the same as the value of the phase change direction flag signal. As such, the direction for changing the phase of additional clock signals for comparison against the RDCLK signal is appropriate to adjust for the currently selected clock signal. For example, a high value for the F/S flag signal indicates that the currently selected clock signal lags the RDCLK signal, and a high value for the phase change direction flag signal indicates that a clock signal with a more leading phase should be selected. Because a more leading phase for the next selected clock signal properly adjusts for a currently selected clock signal which lags the RDCLK signal in phase, the direction for adjusting the phase of the selected clock signal is appropriate for the difference in phase with the RDCLK signal. Likewise, a low value for the F/S flag signal indicates that the currently selected clock signal leads the RDCLK signal, and a low value for the phase change direction flag signal indicates that a clock signal with a more lagging phase should be selected. Because a more lagging phase for the next selected clock signal properly adjusts for a currently selected clock signal which leads the RDCLK signal in phase, the direction for adjusting the phase of the selected clock signal is appropriate for the difference in phase with the RDCLK signal.

With successive comparisons of the RDCLK signal and additional clock signals, the value of F/S flag signal will eventually differ from the value of the phase change direction flag signal. When this occurs, the direction for changing the phase of additional clock signals for comparison against the RDCLK signal is not appropriate to adjust for the currently selected clock signal. For example, a high value for the F/S flag signal indicates that the currently selected clock signal lags the RDCLK signal, and a low value for the phase change direction flag signal indicates that a clock signal with a more lagging phase should be selected. Because a more lagging phase for the next selected clock signal would only increase the phase difference with the RDCLK signal, the direction for adjusting the phase of the selected clock signal is not appropriate. Likewise, a low value for the F/S flag signal indicates that the currently selected clock signal leads the RDCLK signal, and a high value for the phase change direction flag signal indicates that a clock signal with a more leading phase should be selected. Because a more leading phase for the next selected clock signal would only increase the phase difference with the RDCLK signal, the direction for adjusting the phase of the selected clock signal is not appropriate.

The phase comparison (between the RDCLK signal and a selected clock signal) at which the value of fast/slow flag signal first differs from the value of the phase change direction flag signal is significant. In particular, this event can be used to determine or estimate the phase of the RDCLK signal. That is, when the fast/slow flag signal first differs from the phase change direction flag signal in value, the phase of the RDCLK signal will be between the phase of the currently selected clock signal and the previously selected clock signal.

In light of this relationship between the fast/slow flag signal and the phase change direction flag signal, the values stored in F/S status latch circuit 108 and PC direction latch circuit 106 can be used to identify or approximate the phase of the RDCLK signal. As long as the value stored in F/S status latch circuit 108 is the same as the value stored in PC direction latch circuit 106, another clock signal should be selected and compared against the RDCLK signal to find the edge of the RDCLK signal. When the values stored in F/S status latch circuit 108 and PC direction latch circuit 106 first differ, then the edge of the RDCLK signal can be estimated to be near the currently selected clock signal.

Status comparator latch circuit 110 generates and outputs a signal based on the comparison between the contents of F/S status latch circuit 108 and PC direction latch circuit 106.

Control signal generator circuit 114, coupled to status comparator circuit 11, generates a number of control signals in response to a signal output by status comparator circuit 110. These control signals may include, for example, reset or enable signals for all latch circuits in synchronization clock circuitry 22. For example, control signal generator circuit 114 outputs the latch enable signal, which allows the value stored in phase selection latch circuit 96 to be changed.

Increment/decrement circuit 112 is coupled to phase selection latch circuit 96 and phase change direction latch circuit 106, and receives the respective output signals therefrom. Increment/decrement circuit 112 generates the n-bit INC/DEC signal which increases or decreases the numerical value stored in phase selection latch circuit 96, thus causing another one of clock signals $\phi_1, \ldots, \phi_{2^n}$ to be selected.

For example, if the value stored in phase changing direction latch circuit 106 is low (thus indicating that the currently selected clock signal leads the RDCLK signal in phase), increment/decrement circuit 112 outputs a signal which increases the value stored in phase selection latch circuit 96 so that a clock signal with a more lagging phase is selected. Otherwise, increment/decrement circuit 112 outputs a signal which decreases the value stored in phase selection latch circuit 96 so that a clock signal with a more leading phase is selected.

Even/odd cycle detector circuit 116, which is coupled to phase change direction latch circuit 106, receives the phase change direction flag signal for the present device. Even/odd cycle detector circuit 116 also receives incoming phase change direction flag and even/odd cycle flag signals. These incoming flag signals can be from a previous device (i.e., a device along clock line 28 which is closer to the turn-around point than the present device into which synchronization clock circuitry 22 is incorporated). Using the received values, even/odd cycle detector circuit 116 functions to determine whether the phase difference between the FDCLK signal and the RDCLK signal is an even cycle phase difference or an odd cycle phase difference. Even/odd cycle detector circuit 116 outputs an even/odd cycle flag signal for the present device.

Shifter circuit 98, which is coupled to phase selection latch circuit 98 and even/odd cycle detector circuit 116, receives the phase selection signal and the even/odd cycle flag signal. Shifter circuit 98 generates and outputs an n-bit selection signal. To accomplish this, in one embodiment, shifter circuit 98 divides the numerical value stored in phase selection latch circuit 96 by two. The result from this division is used as the least significant bits (LSBs) of the selection signal. The value of the even/odd cycle flag signal is used as most significant bit (MSB) of the selection signal. This selection signal is used to select clock signals for the two components of the universal synchronization clock signal—i.e., the universal synchronization transmission clock (USTXCLK) signal and the universal synchronization receive clock (USRXCLK) signal.

Transmission phase selector circuit 102 and reception phase selector circuit 104 are each coupled to multi-phase clock generator circuit 90 and shifter circuit 98. These phase selector circuits 102 and 104 receive clock signals $\phi_1, \ldots, \phi_{2^n}$ from multi-phase clock generator circuit 90 and the selection signal from shifter circuit 98. In response to the selection signal, transmission phase selector circuit 102 selects one of clock signals $\phi_1, \ldots, \phi_{2^n}$ as the USTXCLK signal. Similarly, in response to the selection signal, reception phase selector circuit 104 selects one of clock signals $\phi_1, \ldots, \phi_{2^n}$ as the USRXCLK signal. In one embodiment, reception phase selector circuit 104 may select a different clock signal ($\phi_1, \ldots, \phi_{2^n}$) from that selected by phase selector circuit 92. In particular, reception phase selector circuit 104 may select a clock signal designated by half the numerical value stored in phase selection latch circuit 96, while phase selector circuit 92 may select a clock signal designated by the full numerical value stored in phase selection latch circuit 96. Transmission phase selector circuit 102 uses the same numerical value as that used by reception phase selector circuit 104, but may select a clock signal which leads the clock signal selected by reception phase selector circuit 104 by 45° in phase.

In operation, the values stored in phase selection latch circuit 96, phase change direction latch circuit 106, and fast/slow status latch circuit 108 may all be initially reset to zero. Because of the zero value stored in phase selection latch 96 after reset, phase selector circuit 92 initially selects the clock signal ($\phi_1, \ldots,$ or $\phi_{2^n}$) having the numerical designation "0," which has same phase as the FDCLK signal. Phase comparator circuit 94 compares this initially selected clock signal with the RDCLK signal. As a result of the comparison, phase comparator circuit 94 outputs the fast/slow flag signal, which indicates whether the selected clock signal leads or lags the RDCLK signal.

Phase change direction latch circuit 106 and fast/slow status latch circuit 108 store the logic value of the fast/slow flag signal. Phase change direction latch circuit 106 outputs the phase change direction flag signal, which determines the direction for changing the phase of the currently selected clock signal ($\phi_1, \ldots,$ or $\phi_{2^n}$) to find the phase of the RDCLK signal. In response to the phase change direction flag signal, increment/decrement circuit 112 outputs a signal for incrementing or decrementing the numerical value stored in phase selection latch circuit 96.

Using this new value, phase selector circuit 92 selects another clock signal ($\phi_1, \ldots,$ or $\phi_{2^n}$), which comparator circuit 94 then compares against the RDCLK signal. As a result of the comparison, comparator circuit 94 outputs another logic value for the fast/slow flag signal. This logic value is stored to fast/slow status latch circuit 108, but not to phase change direction latch circuit 106.

Status comparator circuit 110 compares the logic value stored in fast/slow status latch circuit 108 against the logic value stored in direction latch circuit 106. If the two logic values are the same, then the numerical value stored in phase selection latch circuit 96 is changed, and another clock signal ($\phi_1, \ldots, \phi_{2^n}$) is selected and compared against the RDCLK signal.

The process described above—i.e., selecting a clock signal, comparing the selected clock signal against the RDCLK signal, generating a value for the fast/slow flag signal, comparing the new value for the fast/slow flag signal against the value of the phase change direction flag signal, and changing the value stored in phase selection latch circuit 96—is repeated until the fast/slow flag signal first differs in value from the phase change direction flag signal. When this occurs, the phase of the RDCLK signal will be between the phase of the currently selected clock signal and the previously selected clock signal, thereby determining or estimating the phase of the RDCLK signal.

Controller 100 changes the numerical value stored in phase selection latch circuit 96 for a final time, after which control signal generator circuit 114 issues a latch disable signal. The latch disable signal prevents the value stored in phase selection latch circuit 96 from being changed again, until synchronization clock circuitry 22 is re-initialized.

Shifter circuit 98 receives the numerical value of phase selection latch circuit 96 and divides this number by two. Shifter circuit 98 combines the result of the division with the value of the even/odd cycle flag signal to generates a selection signal, which is used to select the USTXCLK and USRXCLK clock signals with phase selectors 102 and 104, respectively.

Timing Diagrams For Synchronization Clock Circuitry

FIGS. 5A, 5B, and 5C are exemplary timing diagrams for synchronization clock circuitry 22, in accordance with an embodiment of the present invention. These timing diagrams illustrate the operations of the synchronization clock circuitry 22 of a number of devices (master device 12 or slave device 14) that are located at respective positions on clock line 28 (FIG. 1).

FIG. 5A illustrates an exemplary timing diagram 120 for a device that is located on clock line 28 near clock source 26. Timing diagram 120 includes exemplary waveforms for various signals in synchronization clock circuitry 22 of such a device. These waveforms include waveform 122 for the forward direction clock (FDCLK) signal, waveform 124 for the reverse direction clock (RDCLK) signal, waveform 126 for the multiple clock signals output by multi-phase clock generator circuit 90, waveform 128 for the value stored in phase selection latch circuit 96, waveform 130 for the output signal of phase selector circuit 92, waveform 132 for the value stored phase change direction latch circuit 106, waveform 134 for the value stored in fast/slow status latch circuit 108, waveform 136 for the latch enable signal, waveform 138 for the output signal of shifter circuit 98, and waveform 140 for the universal synchronization reception clock (USRXCLK) signal.

Referring to waveforms 122 and 124, the phase difference between the FDCLK signal and the RDCLK signal is approximately one clock cycle, as indicated by delay 123. As represented by waveform 128, the first value stored in phase selection latch circuit 96 is zero, which causes phase selector circuit 92 to initially select the clock signal (one of the clock signals represented in waveform 126) having the same phase as the FDCLK signal. This selected clock signal, as represented by waveform 130, is compared against the RDCLK signal at time $t_1$. A high value for the RDCLK signal at the time of comparison indicates that the selected clock signal lags the RDCLK signal. This causes the value of the fast/slow flag signal to go high. The high value is stored into phase change direction latch circuit 106 and fast/slow status latch circuit 108 as represented by rising edges 132a and 134a, respectively.

Because the values stored in phase change direction latch circuit 106 and fast/slow status latch circuit 108 are the same, the numerical value stored in phase selection latch circuit 96 changes, as indicated by point 128a. The new numerical value is $2^n-1$, designating a clock signal which leads the initially selected clock signal by one unit of phase. The new value stored in phase selection latch circuit 96 causes the designated clock signal to be selected at time $t_2$.

At time $t_3$, the newly selected clock signal is compared against the RDCLK signal. A low value for the RDCLK signal at the time of comparison indicates that the selected clock signal leads the RDCLK signal. This causes the value of the fast/slow flag signal to go low. The low value is stored into fast/slow status latch circuit 108 as represented by falling edge 134*b*.

Because the values stored in phase change direction latch circuit 106 and fast/slow status latch circuit 108 now differ, the phase of the RDCLK signal can be estimated to be the phase of the selected clock signal. Controller 100 causes the value of the latch enable signal to go low, as represented by falling edge 136*a*. The low value for the latch enable signal prevents phase selection latch circuit 96 from storing any new numerical value.

Shifter circuit 98 divides the numerical value of the phase selection latch circuit 96 by two to yield a value of $2^n - \frac{1}{2}$. This numerical value used to select a clock signal for the USRXCLK signal, as represented by waveform 140. Although not explicitly shown, the USTXCLK signal can also be selected using the value output by shifter circuit 98. Thus, both components of the universal synchronization clock signal are available for the present device.

In the exemplary situation represented by FIG. 5A, only two clock signals are selected before deriving the universal synchronization clock signal. In other situations, however, more than two clock signals must be selected before the universal synchronization clock signal is obtained. Such situations are illustrated by FIGS. 5B and 5C.

FIG. 5B illustrates an exemplary timing diagram 150 for a device that is located in the middle of clock line 28. Timing diagram 150 includes exemplary waveforms for various signals in synchronization clock circuitry 22 of such a device. These waveforms include waveform 152 for the forward direction clock (FDCLK) signal, waveform 154 for the reverse direction clock (RDCLK) signal, waveform 156 for the multiple clock signals output by multi-phase clock generator circuit 90, waveform 158 for the value stored in phase selection latch circuit 96, waveform 160 for the output signal of phase selector circuit 92, waveform 162 for the value stored in phase change direction latch circuit 106, waveform 164 for the value stored in fast/slow status latch circuit 108, waveform 166 for the latch enable signal, waveform 168 for the output signal of shifter circuit 98, and waveform 170 for the universal synchronization reception clock (USRXCLK) signal.

In this case, the phase difference between the FDCLK signal and the RDCLK signal is approximately one-half of a clock cycle, as indicated by delay 153. As represented by waveform 158, the first value stored in phase selection latch circuit 96 is 0, which causes phase selector circuit 92 to initially select a clock signal having the same phase as the FDCLK signal. At time $t_1$, the selected clock signal is compared against the RDCLK signal. A low value for the RDCLK signal at the time of comparison indicates that the selected clock signal leads the RDCLK signal, thereby causing the value of the fast/slow flag signal to remain low. The low value is stored in phase change direction latch circuit 106 and fast/slow status latch circuit 108.

Because the values stored in phase change direction latch circuit 106 and fast/slow status latch circuit 108 are the same, the numerical value stored in phase selection latch circuit 96 changes, as indicated by point 158*a*. The new numerical value is 1, designating a clock signal which lags the initially selected clock signal by one unit of phase. The new value stored in phase selection latch circuit 96 causes the designated clock signal to be selected at time $t_2$.

The steps described above are repeated several more times. For example, at times $t_3$, $t_5$, and $t_7$, a newly selected clock signal is compared against the RDCLK signal. For each comparison, a new value for the fast/slow flag signal is generated and stored into fast/slow status latch circuit 108. The value stored in fast/slow status latch circuit 108 is compared against the value stored in phase change direction latch circuit 106. If these values are the same, the numerical value in phase selection latch circuit 96 is changed, for example, as indicated by point 158*b*. Each new value stored in phase selection latch circuit 96 causes another clock signal to be selected, for example, at times $t_4$ and $t_6$.

When the value stored in fast/slow status latch circuit 108 differs from the value stored in phase change direction latch circuit 106, the latch enable signal goes low, as represented by falling edge 166*a*. Shifter circuit 98 divides the value stored in phase selection latch circuit 96 by two, and the result is used to select a clock signal for the USRXCLK signal (as represented by waveform 140) and a clock signal for the USTXCLK signal. Thus, both components of the universal synchronization clock signal are available for the present device.

FIG. 5C illustrates a timing diagram 180 for a device that is located near the turn-around point of clock line 28. Timing diagram 180 includes exemplary waveforms for various signals in synchronization clock circuitry 22 of such a device. These waveforms include waveform 182 for the forward direction clock (FDCLK) signal, waveform 184 for the reverse direction clock (RDCLK) signal, waveform 186 for the multiple clock signals output by multi-phase clock generator circuit 90, waveform 188 for value stored in phase selection latch circuit 96, waveform 190 for the output signal of phase selector circuit 92, waveform 192 for the value stored in phase change direction latch circuit 106, waveform 194 for the value stored in fast/slow status latch circuit 108, waveform 196 for the latch enable signal, waveform 198 for the output signal of shifter circuit 98, and waveform 200 for the universal synchronization reception clock (USRXCLK) signal.

In this case, the phase difference between the FDCLK signal and the RDCLK signal is minimal, as indicated by delay 183. Otherwise, the operation of the synchronization clock circuitry 22 for this device, as determined by the relationship of the various signals represented by waveforms 182–200, is substantially similar to that described above with reference to FIGS. 5A and 5B.

For each of the devices represented with signal waveforms in FIGS. 5A, 5B, and 5C, the respective multi-phase clock generators each output a number of clock signals. Although the same numerical values (i.e., 0 through $2^n - 1$) are used to designate the clock signals in each device, the clock signal designated by a particular value in one device does not necessarily have the same absolute phase as the clock signal designated by the same value in another device. However, the universal synchronization clock signal in each device has the same absolute phase as the universal synchronization clock signals in all other devices.

The process for deriving the universal synchronization clock signal is same for all devices. The first clock signal selected is the one designated by the numerical value of 0. The selected clock signal is compared against the RDCLK signal to generate a value for the fast/slow flag signal. This value is compared against the value of the phase change direction flag signal. Another clock signal is selected if the two values are the same. When the fast/slow flag signal and the phase change direction flag signal differ in value, the numerical value for the currently selected clock signal is operated upon, and the result is used to select the two components of the universal synchronization clock signal (i.e., the USRXCLK signal and the USTXCLK signal). After deriving the universal synchronization clock signal, all devices have a clock signal with the same frequency and phase. The universal synchronization clock signal can then be used to synchronize the transfer of data between the devices.

A device located in the middle of clock line 28 may require more iterations to derive the universal synchronization clock signal than devices located near clock source 26 or the turn-around point of the clock line. This may be due to the fact that in a device located in the middle of clock line 28 a rising edge of the RDCLK signal occurs near the center of a cycle of the FDCLK signal, while in devices located near clock source 26 or the turn-around point a rising edge of the RDCLK signal occurs near the rising edge of the FDCLK signal. In general, the closer a rising edge of the RDCLK signal is to a rising edge of the FDCLK signal, the fewer the iterations required to derive the universal synchronization clock signal.

Timing Diagrams For Clock-Data Skew Correction

FIGS. 6A, 6B, and 6C are exemplary timing diagrams for the correction of clock-data skew, in accordance with an embodiment of the present invention. These timing diagrams illustrate how a number of devices that are located at various positions on clock line 28 in synchronous bus system 10 address clock-data skew.

In general, even after each device in a synchronous bus system 10 has derived or identified the universal synchronization clock signal, signal skew may still exist within system 10. This skew can include the delay between a clock signal (e.g., the universal synchronization clock signal) and the data input/output (I/O) signals of the each device. Furthermore, there can be skew between the various data I/O signals for a single device because in the preferred embodiment of the present invention, the data lines do not have to be matched.

In order to synchronize all data transfers with the universal synchronization clock signal in synchronous bus system 10, the signal skew (including clock-data skew and the skew between various data I/O signals) must be addressed. For this, skew correction circuitry 24 (FIG. 1) is provided in synchronous bus system 10.

Preferably, this skew correction circuitry 24 is incorporated into slave devices 14 rather than master device 12. The rationale for this is as follows. In synchronous bus system 10, data is transferred in the form of signals. Each such data signal is conveyed between a transmitting device and a receiving device, one of which will be master device 12 and the other of which will be a slave device 14. Because master device 12 communicates with many slave devices 14, whereas each slave device 14 communicates only with the master device, master device 12 may operate on a significantly greater number of data signals than any given slave device 14. Skew for each data signal must be addressed either at master device 12 or, alternatively, the respective slave device 14. Incorporating skew correction circuitry into master device 12 for all data signals would be difficult and would significantly affect the implementation of master device 12. Accordingly, separate skew correction circuitry 24 is incorporated into each of slave devices 14 instead.

Skew correction circuitry 24 in each of slave devices 14 generates transmission (TX) clock and reception (RX) clock signals in addition to the USTXCLK and USRXCLK signals. These TX and RX clock signals compensate for any skew between the universal synchronization clock signal and a data signal appearing at an input/output pin of a slave device 14. That is, the TX clock signal adjusts for skew between the USTXCLK signal and an outgoing data signal, and the RX clock signal adjusts for skew between the USRXCLK signal and an incoming data signal. In one embodiment, each data I/O pin of slave devices 14 has its own TX clock and RX clock signals to compensate for clock-data skew.

FIG. 6A illustrates a timing diagram 210 for the transfer of data between master device 12 and a slave device 14 that is located near clock source 26. Timing diagram 210 includes exemplary waveforms for various signals related to such data transfer.

A portion of the waveforms in timing diagram 210 are for signals appearing or occurring at master device 12. These waveforms include waveform 212 for the universal synchronization transmission clock (USTXCLK) signal, waveform 214 for data to be transmitted out of master device 12, waveform 216 for the universal synchronization reception clock (USRXCLK) signal, and waveform 218 for data received at the master device 12.

The remaining waveforms in timing diagram 210 are for signals appearing or occurring at slave device 14. These waveforms include waveform 220 for data received at slave device 14, waveform 222 for the reception (RX) clock signal at the slave device, waveform 224 for data sampled by slave device 14, waveform 226 for sampled data which has been synchronized with USRXCLK signal, waveform 228 for data which has been synchronized with USTXCLK signal for transmission out of slave device 14, waveform 230 for the transmission (TX) clock signal at the slave device, and waveform 232 for synchronized data which has been adjusted for skew using the USTXCLK signal. Furthermore, waveforms 212 and 216 for the USTXCLK signal and the USRXCLK signals at master device 12 can also represent the same two components of the universal synchronization signal at slave device 14 since the universal synchronization signal is synchronous for all devices.

Skew exists between the data signals transmitted by master device 12 and the data signals received at slave device 14. This skew is indicated by delay 213. To correct this skew, slave device 14 uses the skew-corrected RX clock signal (as represented by waveform 222) and TX clock signal (as represented by waveform 230). This skew compensation is indicated by delay 223 and 231. In particular, the skew-corrected RX clock signal lags the USRXCLK signal (as represented by waveform 216) by delay 223 to compensate the skew. The skew-corrected TX clock signal leads the USTXCLK signal (as represented by waveform 212) by delay 231 to compensate the skew. As depicted, the amount of clock-data skew is relatively small. The RX and TX clock signals in slave device 14 compensate for this skew between data signals received by or transmitted out of slave device 14 and the USRXCLK signal and the USTXCLK signal.

In an exemplary transfer of data from master device 12 to slave device 14, data (represented by waveform 214) is sent out at the rising edge of the USTXCLK signal (represented by waveform 212). The data (as represented by waveform 220) is received at a data I/O pin of slave device 14. At the slave device 14, the RX clock signal (as represented by waveform 222) is used to sample the data (as represented by waveform 224). The use of the RX clock signal compensates for the skew (as represented by delay 223) between the received data signal and the USRXCLK signal. After correcting for skew, the sampled data is then synchronized with the USRXCLK signal (as represented by waveform 226). More specifically, the data signal is re-sampled at the rising edge of the USRXCLK signal of the target slave device 14 for synchronization.

In an exemplary transfer of data from slave device 14 to master device 12, the data (as represented by waveform 228) is sampled or prepared at the rising edge of the USTXCLK signal at slave device 14. The data may be re-sampled and transferred out of the slave device 14 (as represented by waveform 232) using the rising edge of the TX clock signal of the data I/O pin. The use of the TX clock signal compensates for the skew (as represented by delay 231) between the transmitted data signal and the USTXCLK signal.

FIG. 6B illustrates a timing diagram 240 for the transfer of data between master device 12 and a slave device 14 that is located near the middle of clock line 28. Timing diagram 240 includes exemplary waveforms for various signals related to such data transfer.

A portion of these waveforms in timing diagram 240 are for signals appearing or occurring at master device 12. These waveforms include waveform 242 for the universal synchronization transmission clock (USTXCLK) signal, waveform 244 for data to be transmitted out of master device 12, waveform 246 for the universal synchronization reception clock (USRXCLK) signal, and waveform 248 for data received at the master device 12.

The remaining waveforms in timing diagram 240 are for signals appearing or occurring at slave device 14. These waveforms include waveform 250 for data received at slave device 14, waveform 252 for the reception (RX) clock signal at the slave device, waveform 254 for data sampled by slave device 14, waveform 256 for sampled data which has been synchronized with USRXCLK signal, waveform 258 for data which has been synchronized with USTXCLK signal for transmission out of slave device 14, waveform 260 for the transmission (TX) clock signal at the slave device, and waveform 262 for synchronized data which has been adjusted for skew using the USTXCLK signal. Furthermore, waveforms 242 and 246 for the USTXCLK signal and the USRXCLK signals at master device 12 can also represent the same two components of the universal synchronization signal at slave device 14 since the universal synchronization signal is synchronous for all devices.

Skew exists between the data signals transmitted by master device 12 and the data signals received at slave device 14. This skew is indicated by delay 243. To correct this skew, the slave device 14 uses the skew-corrected RX clock signal (as represented by waveform 252) and TX clock signal (as represented by waveform 260). This skew compensation is indicated by delay 251 and 261. In particular, the skew-corrected RX clock signal lags the USRXCLK signal (as represented by waveform 246) by delay 251 to compensate the skew. The skew-corrected TX clock signal leads the USTXCLK signal (as represented by waveform 242) by delay 261 to compensate the skew. As depicted, the amount of clock-data skew is relatively small. The RX and TX clock signals (as represented by waveforms 252 and 260) compensate for this skew between data signals received by or transmitted out of slave device 14 and the USRXCLK signal and the USTXCLK signal. As shown, the clock-data skew is approximately half clock cycle.

Compared to the slave device 14 having signals represented in FIG. 6A (with a relatively small amount of clock-data skew), the slave device with signals represented in FIG. 6B has a more delayed RX clock and faster phase TX clock. However, all data is synchronized with the universal synchronization clock after re-sampling, because all slave devices have the same phase universal synchronization clock.

FIG. 6C illustrates a timing diagram 270 for the transfer of data between master device 12 and a slave device 14 that is located near the turn-around point of clock line 28. Timing diagram 270 includes exemplary waveforms for various signals related to such data transfer.

A portion of these waveforms in timing diagram 270 are for signals appearing or occurring at master device 12. These waveforms include waveform 272 for the universal synchronization transmission clock (USTXCLK) signal, waveform 274 for data to be transmitted out of master device 12, waveform 276 for the universal synchronization reception clock (USRXCLK) signal, and waveform 278 for data received at the master device 12.

The remaining waveforms in timing diagram 270 are for signals appearing or occurring at slave device 14. These waveforms include waveform 280 for data received at slave device 14, waveform 282 for the reception (RX) clock signal at the slave device, waveform 284 for data sampled by slave device 14, waveform 286 for sampled data which has been synchronized with USRXCLK signal, waveform 288 for data which has been synchronized with USTXCLK signal for transmission out of slave device 14, waveform 290 for the transmission (TX) clock signal at the slave device, and waveform 292 for synchronized data which has been adjusted for skew using the USTXCLK signal. Furthermore, waveforms 272 and 276 for the USTXCLK signal and the USRXCLK signals at master device 12 can also represent the same two components of the universal synchronization signal at slave device 14 since the universal synchronization signal is synchronous for all devices.

Skew exists between the data signals transmitted by master device 12 and the data signals received at slave device 14. This skew is indicated by delay 273. To correct this skew, the slave device 14 uses the skew-corrected RX clock signal (as represented by waveform 282) and TX clock signal (as represented by waveform 290). This skew compensation is indicated by delay 281 and 291. In particular, the skew-corrected RX clock signal lags the USRXCLK signal (as represented by waveform 276) by delay 281 to compensate the skew. The skew-corrected TX clock signal leads the USTXCLK signal (as represented by waveform 272) by delay 291 to compensate the skew. As depicted, the amount of clock-data skew is relatively large. The RX and TX clock signals (as represented by waveforms 282 and 290) compensate for this skew between data signals received by or transmitted out of slave device 14 and the USRXCLK signal and the USTXCLK signal. As shown, the clock-data skew is almost one complete clock cycle.

Skew Correction Circuitry

FIG. 7 is a block diagram of skew correction circuitry 24, in accordance with an embodiment of the present invention. Skew correction circuitry 24 may be provided for each data input/output (I/O) pin in a slave device 14. In general, skew correction circuitry 24 corrects for skew between the universal synchronization clock signal and a data signal appearing at the respective data I/O pin. Such data signal may be an incoming data signal or an outgoing data signal.

Skew correction circuitry 24 generates a reception (RX) clock signal and a transmission (TX) clock signal which are used to correct for skew. The skew-corrected RX clock signal lags the universal synchronization clock signal by the same amount of phase difference as that of an incoming data signal. The skew-corrected TX clock signal leads the universal synchronization clock signal by the same amount of phase difference as that of an outgoing data signal. In one embodiment, the phase difference by which the skew-corrected RX clock signal lags the universal synchronization clock signal is substantially the same as the phase difference by which the skew-corrected TX clock signal leads the universal synchronization clock signal.

As depicted, skew correction circuitry 24 includes a reception clock phase selector circuit 298, a transmission clock phase selector circuit 300, a phase comparator circuit 302, a reception phase selection latch circuit 304, a transmission phase selection latch circuit 306, a controller 308, a reception data synchronizer circuit 310, a transmission data synchronizer circuit 312, and a driver circuit 314.

Reception phase selection latch circuit 304 latches or stores a value which is a numerical designation (0, ..., $2^n-1$) for one of the clock signals $\phi_1, \ldots, \phi_{2^n}$ output by multi-phase clock generator 90 of synchronization clock circuitry 22 (FIG. 4). Reception phase selection latch circuit 304 generates a phase selection signal, which conveys the numerical designation currently stored in the latch circuit 304. Likewise, transmission phase selection latch circuit 306 latches or stores a value which is a numerical designation (0, ..., $2^n-1$) for one of the clock signals $\phi_1, \ldots, \phi_{2^n}$ and generates a phase selection signal for conveying the numerical designation. Each of reception and transmission phase selection latch circuits 304 and 306 receives a latch enable (EN) signal and a respective increment/decrement (INC/DEC) signal. The INC/DEC signals increment or decrement the numerical values stored in the respective phase selection latch circuits. The latch enable signal allows the numerical values in the phase selection latch circuits to be changed.

Reception clock phase selector circuit 298 is coupled to reception phase selection latch circuit 304, and transmission clock phase selector circuit 300 is coupled to transmission phase selection latch circuit 306. Both reception clock phase selector circuit 298 and transmission clock phase selector circuit 300 receive the multi-phase clock signals $\phi_1, \ldots, \phi_{2^n}$ from multi-phase clock generator circuit 90. Reception clock phase selector circuit 298 and transmission clock phase selector circuit 300 each function as a multiplexer for the clock signals $\phi_1, \ldots, \phi_{2^n}$. More specifically, in response to the selection signal output by reception phase selection latch circuit 304, reception clock phase selector circuit 298 selects one of clock signals $\phi_1, \ldots, \phi_{2^n}$ as the RX clock signal. Likewise, in response to the selection signal output by transmission phase selection latch circuit 306, transmission clock phase selector circuit 300 selects one of clock signals $\phi_1, \ldots, \phi_{2^n}$ as the TX clock signal.

Phase comparator circuit 302, which is coupled to reception clock phase selector circuit 298, receives the selected RX clock signal and an incoming data signal appearing at the data I/O pin. In one embodiment, the incoming data signal is a signal generated by master device 12 and which may contain data for correcting the skew. Phase comparator circuit 302 compares the selected RX clock signal and the incoming data signal and, in response, outputs a fast/slow flag signal. The fast/slow flag signal indicates whether the selected RX clock signal leads or lags the incoming data signal in phase. If the data signal is low at a rising edge of the selected RX clock signal, the selected RX clock signal leads the data signal and, in one embodiment, phase comparator circuit 302 outputs a low value for the fast/slow flag signal. Otherwise, if the data signal is high at a rising edge of the selected RX clock signal, the selected RX clock signal lags the data signal and, in one embodiment, phase comparator circuit 302 outputs a high value for the fast/slow flag signal.

Controller 308 is coupled to phase comparator circuit 302, reception phase selection latch circuit 304, and transmission phase selection latch circuit 306. Controller 308 is generally responsible for the control of skew correction circuitry 24. As depicted, controller 308 may include phase changing (PC) direction latch circuit 316, fast/slow (F/S) status latch circuit 318, status comparator circuit 320, a first increment/decrement (INC/DEC) circuit 322, and a second increment/decrement (INC/DEC) circuit 324.

F/S status latch circuit 318 receives the fast/slow flag signal. The value of the fast/slow flag signal depends on the result of the phase comparison between the currently selected RX clock signal and the incoming data signal (performed by phase comparator circuit 302). In one embodiment, a low value (logic-0) for the fast/slow flag signal indicates that the currently selected RX clock signal leads the incoming data signal, and a high value (logic-1) for the fast/slow flag signal indicates that the currently selected RX clock signal lags the incoming data signal. The value of the fast/slow flag signal, and thus the value stored in F/S status latch circuit 318, can change with each separate comparison performed by phase comparator circuit 302.

Phase change (PC) direction latch circuit 316 is coupled to phase comparator circuit 302. Phase change direction latch circuit 316 stores a value for the phase change direction flag signal of the present device. The phase change direction flag signal is generated from the phase comparison between an incoming data signal and the initially selected RX clock signal, which may be the clock signal having the same phase as that of the USRXCLK signal. In one embodiment, if the initially selected RX clock signal lags the incoming data signal in phase, then the value of the phase change direction signal will be high (logic-1). Otherwise, if the initially selected RX clock signal leads the incoming data signal in phase, then the value of the phase change direction signal will be low (logic-0).

Within skew correction circuitry 24, the phase change direction, the phase change direction flag signal determines the direction for changing the phase of the next selected clock signal $\phi_1, \ldots, \phi_{2^n}$ to find the phase of the incoming data signal. That is, the value stored in phase change direction flag latch circuit 316 indicates whether any additional clock signals to be selected for comparison against the incoming data signal should be more lagging in phase or more leading in phase than the initially selected RX clock signal. For example, if the value of phase change direction latch circuit 316 is low, a clock signal with one minimum resolution lagging the currently selected clock signal is selected for phase comparison with the incoming data signal. Otherwise, if the value of phase change direction latch circuit 316 is high, a clock signal with one minimum resolution leading the currently selected clock signal is selected. After the comparison of the initially selected clock signal and the incoming data signal, the value stored in phase change direction latch circuit 316 does not change with successive comparisons between each newly selected clock signal and the incoming data signal.

Status comparator circuit 320 is coupled to PC direction latch circuit 316 and F/S status latch circuit 318. Status comparator circuit 320 determines whether the value stored in the F/S status latch circuit 318 differs from the value stored in PC direction latch circuit 316. If these two values are different, then the rising (or falling) edge of the incoming data signal is within one minimum phase resolution from the phase of the currently selected clock signal. Otherwise, if the value stored in the F/S status latch circuit 318 is the same as the value stored in phase changing direction latch circuit 316, then the rising (or falling) edge of the incoming data signal is greater than one minimum phase resolution from the phase of the currently selected clock signal. Status comparator circuit 320 generates the latch enable (EN)

signal for allowing the numerical values stored in latch circuits 304 and 306 to be changed.

First increment/decrement circuit 322 is coupled to PC direction latch circuit 316 and reception phase selection latch circuit 304. First increment/decrement circuit 322 receives the PC direction flag signal and the output signal of reception phase selection latch circuit 304 and, in response, generates the INC/DEC signal for increasing or decreasing the numerical value stored in reception phase selection latch circuit 304. This causes another clock signal ($\phi_1, \ldots,$ or $\phi_{2^n}$) to be selected for the RX clock signal in the present device.

Second increment/decrement circuit 324, which is coupled to PC direction latch circuit 316 and transmission phase selection latch circuit 306, receives the PC direction flag signal and the output signal of transmission phase selection latch circuit 306. In response, second increment/decrement circuit 324 generates the INC/DEC signal for increasing or decreasing the numerical value stored in transmission phase selection latch circuit 306. This causes another clock signal (01, . . . , or 02n) to be selected for the TX clock signal in the present device.

In one embodiment, first and second increment/decrement circuits 322 and 324 initiate changes for the respective phase selection latch circuits in opposite directions. For example, when first increment/decrement circuit 322 decrements the numerical value stored in reception phase selection latch circuit 304, second increment/decrement circuit 324 increments the numerical value stored in transmission phase selection latch circuit 306.

Reception data synchronizer circuit 310, which is coupled to reception clock phase selector circuit 298, receives the selected RX clock signal, an incoming data signal, and the universal synchronization clock signal. Reception data synchronizer circuit 310 uses the selected RX clock signal to correct for skew between the incoming data signal and the universal synchronization clock signal, thus allowing data to be recovered from incoming data signal. In one embodiment, reception data synchronizer circuit 310 may output two streams of recovered data: an even data stream and an odd data stream. The recovered data appears in a received data (RX Data) signal.

Transmission data synchronizer circuit 312, which is coupled to transmission clock phase selector circuit 300, receives the selected TX clock signal, a transmit data (TX Data) signal, and the universal synchronization clock signal. The transmit data signal comprises data for output from the present device. In one embodiment, this outgoing data can be in two streams: an even data stream and an odd data stream. Transmission data synchronizer circuit 312 uses the selected TX clock signal to correct for skew between the outgoing data signal and the universal synchronization clock signal, thus allowing data to be output from the present device. Driver circuit 314, coupled to transmission data synchronizer circuit 312, drives the outgoing transmission signal.

In operation, controller 308 initially resets to zero the values stored in phase change direction latch circuit 316 and fast/slow status latch circuit 318. Reception and transmission phase selection latch circuits 304 and 306 both contain the value of the numerical designation for the USRXCLK signal.

In an exemplary operation for receiving data, an incoming data signal (DATA) appearing at the respective data I/O pin is received by phase comparator circuit 302. The value stored in reception phase selection latch circuit 304 causes reception clock phase selector circuit 298 to select a clock signal $\phi_1, \ldots, \phi_{2^n}$ having the same phase as the USRXCLK signal. Phase comparator circuit 302 compares the phase of the incoming data signal to the selected clock signal. As a result of this comparison, phase comparator circuit 302 generates a value for the fast/slow flag signal, which indicates whether the selected clock signal leads or lags the incoming data signal.

Phase change direction latch circuit 316 and fast/slow status latch circuit 318 store the logic value of the fast/slow flag signal. Phase change direction latch circuit 316 outputs the phase change direction flag signal, which determines the direction for changing the phase of the currently selected clock signal ($\phi_1, \ldots,$ or $\phi_{2^n}$) to find the phase of the incoming data signal. In response to the phase change direction flag signal, increment/decrement circuit 322 outputs a signal for incrementing or decrementing the numerical value stored in reception phase selection latch circuit 304.

Using this new value, reception clock phase selector circuit 298 selects another clock signal $\phi_1, \ldots,$ or $\phi_{2^n}$), which phase comparator circuit 302 then compares against the incoming data signal. As a result of the comparison, phase comparator circuit 302 outputs another logic value for the fast/slow flag signal. This logic value is stored to fast/slow status latch circuit 318, but not to phase change direction latch circuit 316.

Status comparator circuit 320 compares the logic value stored in fast/slow status latch circuit 318 against the logic value stored in direction latch circuit 316. If the two logic values are the same, then the numerical value stored in reception phase selection latch circuit 304 is changed, and another clock signal ($\phi_1 \ldots,$ or $\phi_{2^n}$) is selected and compared against the incoming data signal.

The process described above—i.e., selecting a clock signal, comparing the selected clock signal against the incoming data signal, generating a value for the fast/slow flag signal, comparing the new value for the fast/slow flag signal against the value of the phase change direction flag signal, and changing the value stored in reception phase selection latch circuit 304—is repeated until the fast/slow flag signal first differs in value from the phase change direction flag signal. When this occurs, the phase of the incoming data signal will be between the phase of the currently selected clock signal and the previously selected clock signal, thereby determining or estimating the phase of the data signal.

Controller 308 changes the numerical value stored in reception phase selection latch circuit 304 for a final time, after which status comparator circuit 320 issues a latch disable signal. The latch disable signal prevents the value stored in reception phase selection latch circuit 304 from being changed again, until skew correction circuitry 24 is re-initialized.

Once the phase of the incoming data signal has been identified, the currently selected clock signal is used as the RX clock signal. Reception data synchronizer circuit 310 receives the RX clock signal, the incoming data signal, and the universal synchronization clock signal. Reception data synchronizer circuit 310 uses the RX clock signal to correct for skew between the incoming data signal and the universal synchronization clock signal. Reception data synchronizer circuit 310 then outputs the received data (RX Data) for use in the respective slave device 14.

In an exemplary operation for transmitting data, the TX clock signal may be derived from the RX clock signal. Specifically, the phase of the TX clock signal differs from the phase of the USTXCLK signal by the opposite amount as the phase of the RX clock signal. For example, if the RX clock signal lags the USRXCLK signal by two units of phase, the TX clock signal will lead the USTXCLK signal by two units of phase.

The numerical value designating the clock signal ($\phi_1, \ldots,$ or $\phi_{2^n}$) for the TX clock signal is stored in transmission phase selection latch circuit 306. Transmission clock phase selector circuit 300 uses the numerical value to select the preferred clock signal ($\phi_1, \ldots,$ or $\phi_{2^n}$) as the TX clock signal.

Transmission data synchronizer circuit 312 receives the TX clock signal, the universal synchronization clock signal, and one or more streams of data (TX Data) for transmission out of the respective slave device. Transmission data synchronizer circuit 312 uses the TX clock signal to correct for skew between an outgoing data signal and the universal synchronization clock signal. Driver circuit 314 receives the output of transmission data synchronizer circuit 312. Driver circuit 314 drives the outgoing data signal for transmission at the respective data I/O pin.

Timing Diagram For Skew Correction Circuitry

FIG. 8 is an exemplary timing diagram 340 for skew correction circuitry 24, in accordance with an embodiment of the present invention. Timing diagram 340 includes exemplary waveforms for various signals in skew correction circuitry 24. As depicted, these waveforms include waveform 342 for the universal synchronization reception clock (USRXCLK) signal, waveform 344 for the universal synchronization transmission clock (USTXCLK) signal, waveform 346 for an incoming data signal (for skew correction), waveform 347 for the multiple clock signals output by multi-phase clock generator circuit 90 (FIG. 1), waveform 348 for the output of reception phase selection latch circuit 304, waveform 350 for the output signal of reception clock phase selector circuit 298, waveform 352 for the output signal of phase change direction latch circuit 316, waveform 354 for the output signal of fast/slow status latch circuit 318, waveform 356 for the latch enable signal, waveform 358 for the skew-corrected reception (RX) clock signal, and waveform 360 for the skew-corrected transmission (TX) clock signal.

A data signal output by master device 12 for skew correction may have the same phase as the USRXCLK signal (represented by waveform 344) at the time that such data signal is sent out. As the data signal travels from master device 12 to a slave device 14, skew is introduced. Thus, when the data signal (as represented by waveform 346) arrives at the slave device, there is a phase difference (as indicated by delay 357) between the data signal and the USRXCLK signal.

To adjust for the skew, one of the multiple clock signals (as represented by waveform 347) is selected for as the RX clock signal (as represented by waveforms 350 and 358). The selection of a clock signal is determined by the numerical value stored in the reception phase selection latch circuit (as represented by waveform 348). As shown, the numerical value is $X_5$, which causes a clock signal with the same phase as the USRXCLK signal to be selected initially.

The selected clock signal is compared against the incoming data signal at time $t_1$. A low value for the incoming data signal at the time of comparison indicates that the selected clock signal leads the incoming data signal. This causes the value of the fast/slow signal to remain low. The low value is stored into phase change direction latch circuit 316 and fast/slow status latch circuit 318.

Because the values stored in phase change direction latch circuit 316 and fast/slow status latch circuit 318 are the same, the numerical value stored in reception phase selection latch circuit 304 changes, as indicated by point 348*a*. The new numerical value is $X_5+1$, designating a clock signal which lags the initially selected clock signal by one unit of phase.

The new value stored in reception phase selection latch circuit 304 causes another clock signal to be selected at time $t_2$.

At time $t_3$, the newly selected clock signal is compared against the incoming data signal. A low value for the incoming data signal at the time of comparison indicates that the selected clock signal leads the data signal. This causes the value of the fast/slow flag signal to remain low. The low value is stored into fast/slow status latch circuit 318 only. Phase change direction latch circuit 316 continues to store the previous low value.

Again, because the values stored in phase change direction latch circuit 316 and fast/slow status latch circuit 318 are the same, the numerical value stored in reception phase selection latch circuit 304 changes, as indicated by point 348*b*. The new numerical value is $X_5+2$, designating a clock signal which lags the presently selected clock signal by one unit of phase. The new value stored in reception phase selection latch circuit 304 causes another clock signal to be selected at time $t_4$.

The steps described above may be repeated one or more times. For example, at times $t_5$ and $t_7$, a newly selected clock signal is compared against the RDCLK signal. For each comparison, a new value for the fast/slow flag signal is generated and stored into fast/slow status latch circuit 318. The value stored in fast/slow status latch circuit 318 is compared against the value stored in phase change direction latch circuit 316. If these values are the same, the numerical value in reception phase selection latch circuit 304 is changed, for example, as indicated by point 348*c*. Each new value stored in reception phase selection latch circuit 304 causes another clock signal to be selected, for example, at time $t_6$.

Ultimately, the value of the fast/slow signal goes high, as indicated by rising edge 354*a*. When this occurs, the values stored in fast/slow status latch circuit 318 and phase change direction latch circuit 316 will differ. At this time, the phase of the incoming data signal can be estimated to be the phase of the currently selected clock signal. Controller 308 causes the value of the latch enable signal to go low, as represented by falling edge 356*a*, thereby preventing reception phase selection latch circuit 304 from storing any new numerical value.

The currently selected clock is used as the RX clock signal. Because the RX clock signal has the same amount of the delay as that of the incoming data signal, the RX clock signal can be used to correct for the skew between the data signal and the USRXCLK signal.

As previously described, in one embodiment, each data I/O pin of a slave device 14 is provided with separate skew correction circuitry 24, and thus, may have its own RX clock and TX clock signals. The RX clock signals for the various data I/O pins can have different phases; likewise, the TX clock signals for the data I/O pins can have different phases. Separate reception data synchronizer circuits 310 and transmission data synchronizer circuits 312 are provided to synchronize all data I/O pins to the universal synchronization clock signal. Furthermore, because correction for skew is addressed by circuitry at each slave device 14, additional circuitry for performing such operation is not required in master device 12. Master device 12 merely samples the incoming data with the USRXCLK signal and transmits outgoing data with the USTXCLK signal.

Reception Data Synchronizer Circuit

FIG. 9 is a schematic diagram of reception data synchronizer circuit 310, in accordance with an embodiment of the present invention. Reception data synchronizer circuit 310 generally functions to recover data from an incoming data signal (i.e., RX Data signal) using a skew-corrected reception (RX) clock signal to correct for skew between the data signal and the universal synchronization reception clock (USRXCLK) signal. As depicted, reception data synchronizer circuit 310 includes a number of delay (D) flip-flops 370, which are separately labeled with reference numerals 370a, 370b, 370c, 370d, 370e, 370f, and 370g.

The incoming data (represented by corresponding voltages in the data signal) may be divided equally based upon positioning in a stream or sequence. Data at odd-numbered positions in the sequence (i.e., first, third, fifth, etc. positions) constitute "odd data," whereas data at even-numbered positions in the sequence (i.e., second, fourth, sixth, etc. positions) constitute "even data."

In one embodiment, reception data synchronizer circuit 310 may comprise separate circuitry for operating on the odd data and the even data. In particular, odd data synchronization circuitry recovers data at odd-numbered positions in the sequence (i.e., first, third, fifth, etc. positions), and even data synchronization circuitry recovers data at even-numbered positions in the sequence (i.e., second, fourth, sixth, etc. positions).

With reference to FIG. 9, D flip-flops 370a, 370b, 370c, and 370d form the odd data synchronization circuitry to recover odd-numbered data. Flip-flop 370a receives the incoming data signal at its "D" input and the skew-corrected RX clock signal at its clock input. The remaining flip-flops 370b, 370c, and 370d are sequentially connected to flip-flop 370a. That is, each of flip-flops 370b, 370c, and 370d receives (at its "D" input) the output of the previous flip-flop. Flip-flops 370b and 370d receive the USRXCLK signal at their clock inputs. Flip-flop 370c receives the negation of the USRXCLK signal at its clock input.

D flip-flops 370e, 370f, and 370g form the even data synchronization circuitry to recover even-numbered data. Flip-flop 370e receives the incoming data signal at its "D" input and the negation of the skew-corrected RX clock signal at its clock input. The other flip-flops 370f and 370g are sequentially connected to flip-flop 370e. That is, each of flip-flops 370f and 370g receives (at its "D" input) the output of the previous flip-flop. Flip-flop 370f receives the negation of the USRXCLK signal at its clock input, and flip-flop 370g receives the USRXCLK signal at its clock input.

Reception data synchronizer circuit 310 is divisible by stages, which sequentially operate on the incoming data signal. A first stage comprises flip-flop 370a of the odd data synchronization circuitry and flip-flop 370e of the even data synchronization circuitry. A second stage comprises flip-flop 370b of the odd data synchronization circuit and flip-flop 370f of the even data synchronization circuitry. A third stage comprises flip-flops 370c, 370d of the odd data synchronization circuit and flip-flop 370g of the even data synchronization circuitry. Each stage functions as a latch to latch data for some period of time.

In operation, in the first stage, flip-flop 370a samples and latches the incoming data signal at the rising edge of the skew-corrected RX clock signal. Thereafter, this data is considered to be odd data. Flip-flop 370e samples and latches the same data signal at the falling edge of the skew-corrected RX clock signal. Thereafter, this data is considered to be even data.

By using skew-corrected RX clock signal to receive data in the first stage, reception data synchronizer circuit 310 corrects for any skew between the incoming data signal and the universal synchronization clock signal. Thereafter, for any given data, the USRXCLK signal may be used for timing the remainder of the operations for receiving the data. This synchronizes the data signal.

More specifically, in the second stage, the data sampled by the first stage is re-sampled by the second stage with the USRXCLK signal. In particular, flip—flip 370b samples and latches the odd data at the rising edge of the USRXCLK signal, while flip-flop 370f samples and latches the even data at the falling edge of the USRXCLK signal.

In the third stage, flip-flops 370c, 370d, and 370g cooperate to synchronize the odd data and the even data. More specifically, at the rising edge of the USRXCLK signal, odd data and even data are simultaneously transferred out of reception data synchronizer circuit 310.

In an alternative embodiment, the three flip-flops 370c, 370d, and 370g of the third stage can be replaced with a two-to-one (2×1) multiplexer. In this alternative embodiment, the odd and even data can be synchronized with both edges of the USRXCLK clock signal.

Timing Diagrams For Reception Data Synchronizer Circuit

Figure 10A:
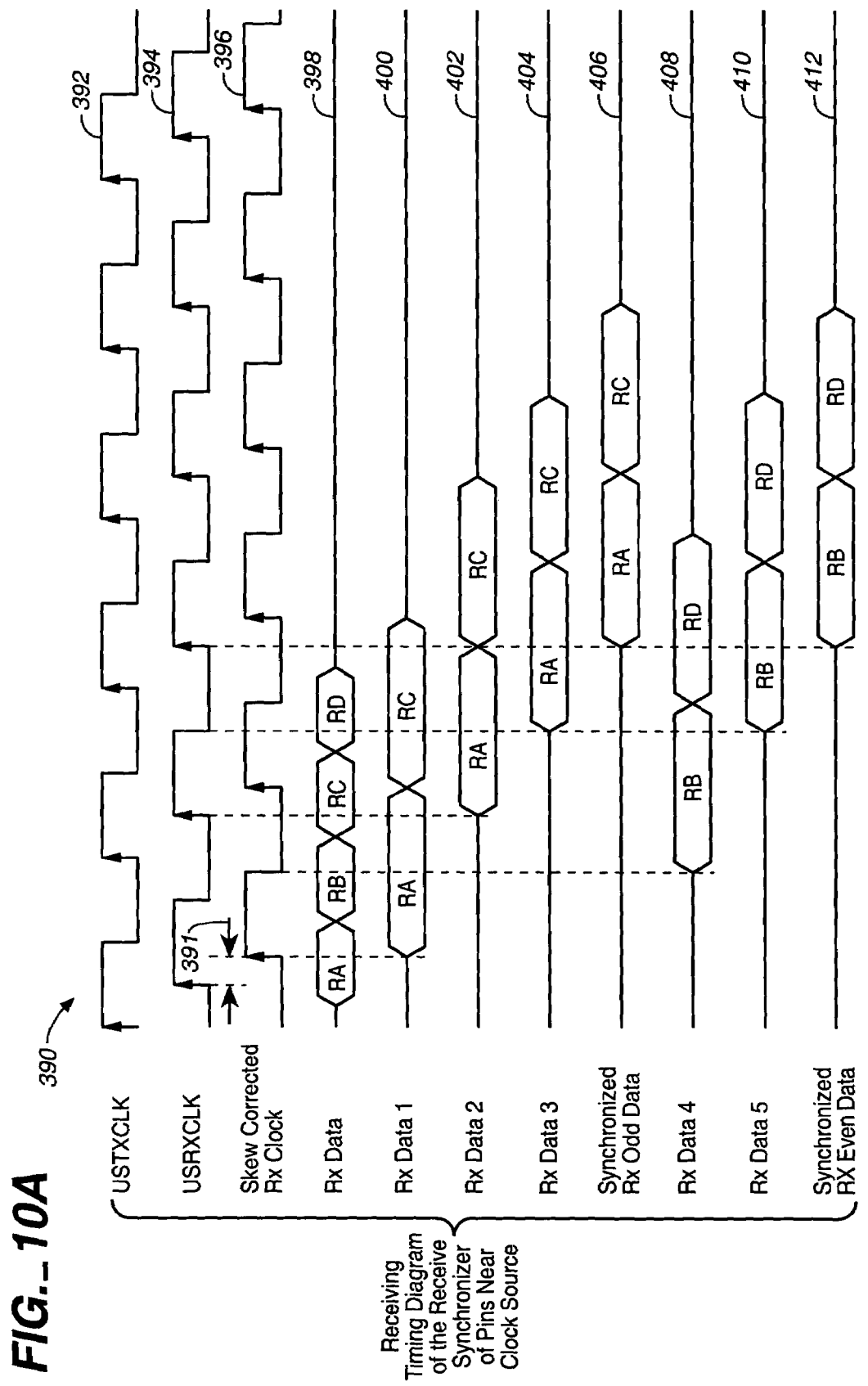

FIGS. 10A, 10B, and 10C are exemplary timing diagrams for reception data synchronizer circuit 310, in accordance with an embodiment of the present invention. These timing diagrams illustrate the operations of reception data synchronizer circuit 310 for varying amounts of skew.

FIG. 10A illustrates a timing diagram 390 for reception data synchronizer circuit 310 in which the clock-data skew is within one-half of a cycle, as indicated by delay 391. Timing diagram 390 includes exemplary waveforms for various signals in reception data synchronizer circuit 310 for such case. These waveforms include waveform 392 for the universal synchronization transmission clock (USTXCLK) signal, waveform 394 for the universal synchronization reception clock (USRXCLK) signal, waveform 396 for the skew-corrected reception (RX) clock signal, waveform 398 for the data signal (RX Data) appearing at the data I/O pin for which reception data synchronizer circuit 310 is provided, waveform 400 for the output signal (RX Data1) of flip-flop 370a, waveform 402 for the output signal (RX Data2) of flip-flop 370b, waveform 404 for the output signal (RX Data3) of flip-flop 370c, waveform 406 for the output signal (Synchronized RX Odd Data) of flip-flop 370d, waveform 408 for the output signal (RX Data4) of flip-flop 370e, waveform 410 for the output signal (RX Data5) of flip-flop 370f, and waveform 412 for the output signal (Synchronized RX Even Data) of flip-flop 370g.

Referring to waveform 398, data elements RA, RB, RC, and RD appear in the incoming data signal RX Data. These data elements are sampled at the rising and falling edges of two cycles of the skew-corrected RX clock signal, as represented by waveform 396. As a result of sampling, data elements RA and RC are output by flip-flop 370a in signal RX Data1, as represented by waveform 400; data elements RB and RD are output by flip-flop 370e in signal RX Data4, as represented by waveform 408. Data elements RA and RC may be considered to be "odd data," and data elements RB and RD may be considered to be "even data." The use of RX clock signal to initially receive data corrects for the skew (as represented by delay 391) between the incoming RX Data signal and the USRXCLK signal.

At the rising edges of the USRXCLK signal (represented by waveform 394), data elements RA and RC are sampled again and output by flip-flop 370b in signal RX Data2, as represented by waveform 402. At the falling edges of the USRXCLK signal, data elements RB and RD are sampled again and output by flip-flop 370f in signal RX Data5, as represented by waveform 410. As shown in timing diagram 390, hold times are provided for the sampling performed by flip-flops 370b and 370f.

For synchronization of the odd data and the even data, data elements RA and RC are re-sampled twice, and data elements RB and RD are re-sampled once. In particular, at falling edges of the USRXCLK signal, data elements RA and RC are sampled and output by flip-flop 370c in signal RX Data3, as represented by waveform 404. Then, at rising edges of the USRXCLK signal, data elements RA and RC are sampled and output by flip-flop 370d in signal Synchronized RX Odd Data, as represented by waveform 406, and concurrently, data elements RB and RD are sampled and output by flip-flop 370g in signal Synchronized RX Even Data, as represented by waveform 412. Accordingly, reception data synchronizer circuit 310 outputs the synchronized odd data and even data simultaneously at the rising edges of the USRXCLK signal.

FIG. 10B illustrates a timing diagram 420 for reception data synchronizer circuit 310 in which the clock-data skew is approximately one-half of a cycle, as indicated by delay 421. Timing diagram 420 includes exemplary waveforms for various signals in reception data synchronizer circuit 310 for such case. These waveforms include waveform 422 for the universal synchronization transmission clock (USTXCLK) signal, waveform 424 for the universal synchronization reception clock (USRXCLK) signal, waveform 426 for the skew-corrected reception (RX) clock signal, waveform 428 for the data signal (RX Data) appearing at the data I/O pin for which reception data synchronizer circuit 310 is provided, waveform 430 for the output signal (RX Data1) of flip-flop 370a, waveform 432 for the output signal (RX Data2) of flip-flop 370b, waveform 434 for the output signal (RX Data3) of flip-flop 370c, waveform 436 for the output signal (Synchronized RX Odd Data) of flip-flop 370d, waveform 438 for the output signal (RX Data4) of flip-flop 370e, waveform 440 for the output signal (RX Data5) of flip-flop 370f, and waveform 442 for the output signal (Synchronized RX Even Data) of flip-flop 370g.

The operation for the case depicted in FIG. 10B is substantially similar to the case depicted and described with reference to FIG. 10A. Thus, ultimately, reception data synchronizer circuit 310 outputs synchronized odd data (e.g., data elements RA and RC) and even data (e.g., data elements RB and RD) simultaneously at the rising edges of the USRXCLK signal.

FIG. 10C illustrates a timing diagram 450 for reception data synchronizer circuit 310 in which the clock-data skew is greater than one-half of a cycle, as indicated by delay 451. Timing diagram 450 includes exemplary waveforms for various signals in reception data synchronizer circuit 310 for such case. These waveforms include waveform 452 for the universal synchronization transmission clock (USTXCLK) signal, waveform 454 for the universal synchronization reception clock (USRXCLK) signal, waveform 456 for the skew-corrected reception (RX) clock signal, waveform 428 for the data signal (RX Data) appearing at the data I/O pin for which reception data synchronizer circuit 310 is provided, waveform 460 for the output signal (RX Data1) of flip-flop 370a, waveform 462 for the output signal (RX Data2) of flip-flop 370b, waveform 464 for the output signal (RX Data3) of flip-flop 370c, waveform 466 for the output signal (Synchronized RX Odd Data) of flip-flop 370d, waveform 468 for the output signal (RX Data4) of flip-flop 370e, waveform 470 for the output signal (RX Data5) of flip-flop 370f, and waveform 472 for the output signal (Synchronized RX Even Data) of flip-flop 370g.

The operation for the case depicted in FIG. 10C is substantially similar to the cases depicted and described with reference to FIGS. 10A and 10B. Thus, ultimately, reception data synchronizer circuit 310 outputs synchronized odd data (e.g., data elements RA and RC) and even data (e.g., data elements RB and RD) simultaneously at the rising edges of the USRXCLK signal.

Transmission Data Synchronizer Circuit

FIG. 11 is a schematic diagram of transmission data synchronizer circuit 312, in accordance with an embodiment of the present invention. Transmission data synchronizer circuit 312 may operate on one or more streams of data to generate a transmission (TX) data signal for output from a slave device 14. To accomplish this, transmission data synchronizer circuit 312 uses a transmission (TX) clock signal to correct for skew between the outgoing data signal and the universal synchronization transmission clock (USTXCLK) signal. As depicted, transmission data synchronizer circuit 312 includes a and a number of delay (D) flip-flops 482, which are separately labeled with reference numerals 482a, 482b, 482c, 482d, 482e, 482f, 482g, and 482h.

As shown, the data for output from the slave device may arrive at transmission data synchronizer circuit 312 in two separate streams. These data streams are combined in the output data signal so the individual bits of data are interleaved. In one embodiment, data from one stream may occupy odd-numbered positions (i.e., first, third, fifth, etc. positions) in the outgoing signal, and data from the other stream may occupy even-numbered positions (i.e., second, fourth, sixth, etc. positions) in the outgoing signal. Thus, data in one stream may be referred to as an "odd data," and data in the other stream may be referred to as an "even data."

In one embodiment, transmission data synchronizer circuit 312 may comprise separate circuitry for operating on the odd data and the even data. In particular, odd data synchronization circuitry processes the odd data (in one stream), and even data synchronization circuitry processes the even data (in the other stream).

With reference to FIG. 11, D flip-flops 482a, 482b, 482c, and 482d form the odd data synchronization circuitry which processes the odd data. Flip-flop 482a receives the incoming stream for the odd data at its "D" input and the USRXCLK signal at its clock input. The remaining flip-flops 482b, 482c, and 482d are sequentially connected to flip-flop 482a. That is, each of flip-flops 482b, 482c, and 482d receives (at its "D" input) the output of the previous flip-flop. Flip-flop 482b receives the negation of the USRXCLK signal at its clock input. Flip-flop 482c receives the USTXCLK signal at its clock input. Flip-flop 482d receives the skew-corrected TX clock signal at its clock input.

D flip-flops 482e, 482f, and 482g form the even data synchronization circuitry to process the even data. Flip-flop 482e receives the incoming stream for the even data at its "D" input and the USRXCLK signal at its clock input. The other flip-flops 482f, 482g, and 482h are sequentially connected to flip-flop 482e. That is, each of flip-flops 482f, 482g, and 482h receives (at its "D" input) the output of the previous flip-flop. Flip-flop 482f receives the negation of the USRXCLK signal at its clock input. Flip-flop 482g receives the negation of the USTXCLK signal at its clock input.

Flip-flop 482h receives the negation of the skew corrected TX clock signal at its clock input.

Transmission data synchronizer circuit 312 is divisible by stages, which sequentially operate on the incoming data signal. A first stage comprises flip-flop 482a of the odd data synchronization circuitry and flip-flop 482e of the even data synchronization circuitry. A second stage comprises flip-flop 482b of the odd data synchronization circuitry and flip-flop 482f of the even data synchronization circuitry. A third stage comprises flip-flop 482c of the odd data synchronization circuit and flip-flop 482g of the even data synchronization circuitry. A fourth stage comprises flip-flop 482d of the odd data synchronization circuit, flip-flop 482h of the even data synchronization circuitry, and multiplexer 480. Each of the first, second, third, and fourth stages functions as a latch to latch data for some period of time.

In an alternate embodiment, flip-flops 482a, 482b, 482e, and 482f of the first and second stages of transmission data synchronizer circuit 312 can be replaced with a one-to-two (1×2) de-multiplexer.

In operation, in the first stage, flip-flops 482a and 482e sample and latch the incoming odd data and even data, respectively, at the rising edge of the USRXCLK signal. In the second stage, flip-flips 482b and 482f sample and latch the odd data and the even data from flips-flops 482a and 482e, respectively, at the falling edge of the USRXCLK signal.

In an alternative embodiment, wherein the first and second stages are replaced with a one-to-two (1×2) de-multiplexer, such de-multiplexer operates on data at both edges of the USRXCLK signal.

At the third stage, flip-flop 482c samples and latches the odd data at the rising edge of the USTXCLK signal. Flip-flop 482g samples and latches the even data at the falling edge of the USTXCLK signal.

At the fourth stage, multiplexer 480 cooperates with flip-flops 482d and 482h to transfer the odd and even data to a bus at the rising and falling edges of the skew-corrected TX clock signal. Essentially, the two data streams (comprising odd data and even data) are interleaved into a single, outgoing data signal TX Data. The use of the TX clock signal to transmit the outgoing data corrects any skew that may arise between the data signal and the universal synchronization clock signal at master device 12 (which receives the data signal).

Timing Diagrams For Transmission Data Synchronizer Circuit

FIGS. 12A, 12B, and 12C are exemplary timing diagrams for transmission data synchronizer circuit 312, in accordance with an embodiment of the present invention. These timing diagrams illustrate the operations of transmission data synchronizer circuit 312 for varying amounts of skew.

FIG. 12A illustrates a timing diagram 500 for transmission data synchronizer circuit 312 in which the clock-data skew is within one-half of a cycle, as indicated by delay 501. Timing diagram 500 includes exemplary waveforms for various signals in transmission data synchronizer circuit 312 for such case. These waveforms include waveform 502 for the universal synchronization transmission clock (USTXCLK) signal, waveform 504 for the universal synchronization reception clock (USRXCLK) signal, waveform 506 for the skew-corrected transmission (TX) clock signal, waveform 508 for odd data (Synchronized TX Odd Data) to be transmitted out of the respective slave device 14, waveform 510 for even data (Synchronized TX Even Data) to be transmitted out of the respective slave device 14, waveform 512 for the output signal (TX Data1) of flip-flop 482b, waveform 514 for the output signal (TX Data2) of flip-flop 482c, waveform 516 for the output signal (TX Data3) of flip-flop 482d, waveform 518 for the output signal (TX Data4) of flip-flop 482f, waveform 520 for the output signal (TX Data5) of flip-flop 482g, waveform 522 for the output signal (TX Data5) of flip-flop 482h, and waveform 524 for the output signal (TX Data) of multiplexer 480.

Referring to waveforms 508 and 510, data elements TA and TC (considered to be odd data) appear in a first stream of outgoing data, and data elements TB and TD (considered to be even data) appear in a second stream of outgoing data. These two data streams are synchronized at this time with the universal synchronization clock signal. The data elements of the two streams are initially sampled by flip-flops 482a and 482e on the rising edges of two cycles of the USRXCLK signal. Then the data elements are again sampled at the falling edges of two cycles of the USRXCLK signal, as represented by waveform 504. As a result of sampling, data elements TA and TC are output by flip-flop 482b in signal TX Data1, as represented by waveform 512; data elements TB and TD are output by flip-flop 482f in signal TX Data4, as represented by waveform 518.

At the rising edges of the USTXCLK signal (represented by waveform 502), data elements TA and TC are sampled and output by flip-flop 482c in signal TX Data2, as represented by waveform 514. At the falling edges of the USTXCLK signal, data elements TB and TD are sampled and output by flip-flop 482g in signal TX Data5, as represented by waveform 520.

To interleave the two data streams and correct for skew, the odd data and the even data are sampled with alternating edges of the skew-corrected TX clock signal (represented by waveform 505). In particular, at rising edges of the TX clock signal, data elements TA and TC are sampled and output by flip-flop 482d in signal TX Data3, as represented by waveform 516. At falling edges of the TX clock signal, data elements TB and TD are sampled and output by flip-flop 482h in signal TX Data6, as represented by waveform 522. Multiplexer 480 alternately outputs data from TX Data3 and TX Data6 in the output signal TX Data, as represented by waveform 524.

FIG. 12B illustrates a timing diagram 530 for transmission data synchronizer circuit 312 in which the clock-data skew is approximately one-half of a cycle, as indicated by delay 531. Timing diagram 530 includes exemplary waveforms for various signals in transmission data synchronizer circuit 312 for such case. These waveforms include waveform 532 for the universal synchronization transmission clock (USTXCLK) signal, waveform 534 for the universal synchronization reception clock (USRXCLK) signal, waveform 536 for the skew-corrected transmission (TX) clock signal, waveform 538 for odd data (Synchronized TX Odd Data) to be transmitted out of the respective slave device 14, waveform 540 for even data (Synchronized TX Even Data) to be transmitted out of the respective slave device 14, waveform 542 for the output signal (TX Data1) of flip-flop 482b, waveform 544 for the output signal (TX Data2) of flip-flop 482c, waveform 546 for the output signal (TX Data3) of flip-flop 482d, waveform 548 for the output signal (TX Data4) of flip-flop 482f, waveform 550 for the output signal (TX Data5) of flip-flop 482g, waveform 552 for the output signal (TX Data5) of flip-flop 482h, and waveform 554 for the output signal (TX Data) of multiplexer 480.

The operation for the case depicted in FIG. 12B is substantially similar to the case depicted and described with reference to FIG. 12A. Thus, ultimately, transmission data synchronizer circuit 312 outputs a TX Data signal which is a multiplex of odd data (e.g., data elements RA and RC) and even data (e.g., data elements RB and RD) and which is corrected for skew using the TX clock signal.

FIG. 12C illustrates a timing diagram 560 for transmission data synchronizer circuit 312 in which the clock-data skew is greater than one-half of a cycle, as indicated by delay 561. Timing diagram 560 includes exemplary waveforms for various signals in transmission data synchronizer circuit 312 for such case. These waveforms include waveform 562 for the universal synchronization transmission clock (USTXCLK) signal, waveform 564 for the universal synchronization reception clock (USRXCLK) signal, waveform 566 for the skew-corrected transmission (TX) clock signal, waveform 568 for odd data (Synchronized TX Odd Data) to be transmitted out of the respective slave device 14, waveform 570 for even data (Synchronized TX Even Data) to be transmitted out of the respective slave device 14, waveform 572 for the output signal (TX Data1) of flip-flop 482b, waveform 574 for the output signal (TX Data2) of flip-flop 482c, waveform 576 for the output signal (TX Data3) of flip-flop 482d, waveform 578 for the output signal (TX Data4) of flip-flop 482f, waveform 580 for the output signal (TX Data5) of flip-flop 482g, waveform 582 for the output signal (TX Data5) of flip-flop 482h, and waveform 584 for the output signal (TX Data) of multiplexer 480.

The operation for the case depicted in FIG. 12C is substantially similar to the cases depicted and described with reference to FIGS. 12A and 12B. Thus, ultimately, transmission data synchronizer circuit 312 outputs a TX Data signal which is a multiplex of odd data (e.g., data elements RA and RC) and even data (e.g., data elements RB and RD) and which is corrected or skew using the TX clock signal.

Thus, as described herein, a synchronous bus system 10 of the present invention can support the transfer of data and control information among a master device 12 and a number of slave devices 14. The synchronous bus system 10 includes a two-segment clock line 28, synchronization clock circuitry 22 in all devices, and clock-data skew correction circuitry in only slave devices 14. Clock line 28 can run physically parallel to a data bus for transmitting data between the devices. Clock line 28 extends from a clock source 26, connects to each of master device 12 and slave devices 14 in a forward direction, turns around at a distal end of the data bus, and connects again to each of master device 12 and slave devices 14 in a reverse direction. Synchronization clock circuitry 22 allows all devices to derive a universal synchronization clock signal (comprising a transmission and reception signal components) that is used as a reference clock in each devices. Skew correction circuitry 24 compensates or corrects for clock-data skew caused by any mismatch between clock line 28 and the data bus. Skew correction circuitry 24 also synchronizes all data input/output transactions to the universal synchronization clock signal. As a result, master device 12 can readily communicate with all slave devices 14, even if clock-data skew exists in the synchronous bus system 10.

Although the present invention and its advantages have been described in detail, it should be understood that various changes, substitutions, and alterations can be made therein without departing from the spirit and scope of the invention as defined by the appended claims.

What is claimed is:

1. A method comprising:
   carrying a forward direction clock signal along a forward direction clock segment of a clock line connected to each of a plurality of devices;
   carrying a reverse direction clock signal along a reverse direction clock segment of the clock line connected to each of the plurality of devices;
   receiving the forward direction clock signal and the reverse direction clock signal at each of the plurality of devices; and
   deriving at each of the plurality of devices a universal synchronization clock signal using the single forward direction clock signal and the single reverse direction clock signal and no other forward or reverse direction clock signals, wherein the universal synchronization clock signal is synchronous throughout the plurality of devices even when a delay between the forward direction clock signal and the reverse direction clock signal is greater than one clock cycle.

2. The method of claim 1 comprising identifying a center of phase between the forward direction clock signal and the reverse direction clock signal.

3. The method of claim 1 comprising generating a flag signal for indicating whether a phase difference between the forward direction clock signal and the reverse direction clock signal is an even cycle phase difference or an odd cycle phase difference.

4. The method of claim 1 comprising selecting one of a plurality of clock signals, each clock signal having a different phase, for use as the universal synchronization clock signal.

5. The method of claim 1 comprising correcting for skew between the universal synchronization clock signal and a data signal.

* * * * *